(12) United States Patent  (10) Patent No.: US 8,544,948 B2
Nitsuma  (45) Date of Patent: Oct. 1, 2013

(54) VEHICLE SEAT

(75) Inventor: Kenichi Nitsuma, Tochigi (JP)

(73) Assignee: TS Tech Co., Ltd., Saitama (JP)

(*) Notice: Subject to any disclaimer, the term of this patent is extended or adjusted under 35 U.S.C. 154(b) by 606 days.

(21) Appl. No.: 12/691,007

(22) Filed: Jan. 21, 2010

(65) Prior Publication Data

US 2010/0181812 A1 Jul. 22, 2010

(30) Foreign Application Priority Data

Jan. 21, 2009 (JP) ................................. 2009-011461
Jan. 21, 2009 (JP) ................................. 2009-011462
Jan. 28, 2009 (JP) ................................. 2009-017392

(51) Int. Cl.
B60N 2/42 (2006.01)

(52) U.S. Cl.
USPC .................................. 297/216.14; 297/216.13

(58) Field of Classification Search
USPC ................. 297/216.12, 216.13, 216.14, 284.4
See application file for complete search history.

(56) References Cited

U.S. PATENT DOCUMENTS

| 6,199,947 | B1 * | 3/2001 | Wiklund | 297/216.12 |
| 6,250,714 | B1 * | 6/2001 | Nakano et al. | 297/216.12 |
| 6,520,577 | B2 * | 2/2003 | Kitagawa | 297/216.13 |
| 6,523,892 | B1 * | 2/2003 | Kage et al. | 297/216.13 |
| 6,866,339 | B2 * | 3/2005 | Itoh | 297/216.13 |
| 7,530,633 | B2 * | 5/2009 | Yokota et al. | 297/216.12 |
| 7,641,280 | B2 * | 1/2010 | Uno et al. | 297/216.12 |
| 7,677,657 | B2 * | 3/2010 | Park et al. | 297/216.12 |
| 7,758,114 | B2 * | 7/2010 | Yokota et al. | 297/216.12 |
| 7,963,599 | B2 * | 6/2011 | Omori et al. | 297/216.12 |
| 7,984,945 | B2 * | 7/2011 | Sayama | 297/216.12 |
| 8,061,774 | B2 * | 11/2011 | Omori et al. | 297/284.4 |
| 8,113,578 | B2 * | 2/2012 | Furuta et al. | 297/216.13 |
| 8,162,392 | B2 * | 4/2012 | Humer et al. | 297/216.12 |
| 8,162,394 | B2 * | 4/2012 | Yasuda et al. | 297/216.12 |
| 2002/0030392 | A1 * | 3/2002 | Kitagawa | 297/216.13 |
| 2002/0043832 | A1 * | 4/2002 | Watanabe | 297/216.13 |
| 2002/0053819 | A1 * | 5/2002 | Itoh | 297/216.13 |
| 2008/0088158 | A1 * | 4/2008 | Yokota et al. | 297/216.12 |
| 2010/0176630 | A1 * | 7/2010 | Nitsuma | 297/216.13 |
| 2010/0187876 | A1 * | 7/2010 | Nitsuma | 297/216.13 |
| 2010/0264704 | A1 * | 10/2010 | Yasuda et al. | 297/216.12 |
| 2011/0272978 | A1 * | 11/2011 | Nitsuma | 297/216.12 |
| 2011/0278886 | A1 * | 11/2011 | Nitsuma | 297/216.13 |
| 2012/0299343 | A1 * | 11/2012 | Yasuda et al. | 297/216.12 |

FOREIGN PATENT DOCUMENTS

| JP | 2000-272395 A | 10/2000 |
| JP | 2005-028956 A | 2/2005 |
| JP | 2007-062522 A | 3/2007 |
| WO | WO 2007142162 A1 * | 12/2007 |

* cited by examiner

Primary Examiner — David E Allred
(74) Attorney, Agent, or Firm — Drinker Biddle & Reath LLP

(57) ABSTRACT

A vehicle seat is provided in which a shock reducing member provides an optimum state both under a usual (normal) seating load and in a rear-end collision load, the sinking (moving) amount of the passenger's body to the vehicle rear at the time of rear-end collision can be increased, and a shock applied to a passenger at the time of rear-end collision can be reduced effectively, independently from a headrest. A vehicle seat includes a seat back frame, a headrest, a pressure receiving member connected to the seat back frame via wires, and a rotating member disposed at least on one side of side parts on both sides of the seat back frame. The rotating member is rotated by a predetermined impact load applied to the pressure receiving member, and comes into contact with the seat back frame, whereby the rotating is inhibited.

21 Claims, 17 Drawing Sheets

VEHICLE SEAT

CROSS-REFERENCE TO RELATED APPLICATIONS

This application claims the benefit of Japanese Patent Application No. 2009-011461, filed Jan. 21, 2009, Japanese Patent Application No. 2009-011462, filed Jan. 21, 2009, and Japanese Patent Application No. 2009-017392, filed Jan. 28, 2009, the entire contents of which are incorporated herein by reference.

BACKGROUND

The present invention relates to a vehicle seat and, more particularly, to a vehicle seat configured so as to reduce a shock at the time of rear-end collision.

Generally, in a so-called rear-end collision, in which the rear part of a vehicle, such as an automobile, is struck from behind, or collides heavily when running backward, the head of a passenger on a vehicle seat is tilted to the rear suddenly by an inertial force, and the neck of the passenger may get a shock.

Therefore, conventionally, the seat for a vehicle such as an automobile is provided with a headrest, which supports the passenger's head, above a seat back to protect the passenger's head and neck from a shock caused by rear-end collision and to reduce the shock to the neck.

However, if the headrest is merely provided, the shock to the passenger's body cannot be reduced, and also, in some cases, the shock applied to the neck cannot be reduced sufficiently unless a gap between the passenger's head and the headrest is decreased quickly when a rear-end collision occurs.

To solve the above-described problems, there has been disclosed a technique in which in a vehicle seat provided with a seat back in which a seat back cushion is supported by a seat back frame, an abutting part of the seat back on which the back part of the passenger abuts in rear-end collision has a spring coefficient smaller than that of other parts and a damping coefficient larger than that of other parts (for example, refer to Japanese Unexamined Patent Application Publication No. 2005-028956 ("the '956 Publication")).

Also, there has been proposed a vehicle seat in which in a seat back having a headrest, a movable frame having a spring body for supporting a cushion material is attached to a fixed frame to which the headrest is mounted in an upper part so that the upper part of the movable frame rotates to the rear around the lower part thereof, and between the fixed frame and the movable frame is provided a spring that carries a usual seating load, but permits the movable frame to rotate rearward when an impact load not lower than a predetermined value is applied (refer to Japanese Unexamined Patent Application Publication No. 2000-272395 ("the '395 Publication")).

Further, there has been known a technique in which both of the right and left sides of a headrest mounting rod are attached to a seat back frame via an upper side link for moving the headrest back and forth (refer to Japanese Unexamined Patent Application Publication No. 2007-062522 ("the '522 Publication")).

The technique disclosed in the '956 Publication aims to ease the shock to the passenger. In the technique disclosed this publication, by decreasing the spring coefficient of the abutting part of seat back on which the back part ("the chest part" in this publication) of the passenger abuts, the rearward displacement of the upper body is increased, and the relative displacement of the head with respect to the back part is decreased. Also, by increasing the damping coefficient by using a low resilience cushion material, the rebound of the upper body is restrained to decrease the relative speed of the head with respect to the back part. Thereby, a shearing force acting on the neck is decreased.

Unfortunately, the technique in which the spring coefficient is decreased and the technique in which the low resilience cushion material is used have a disadvantage that the sinking of the body to the vehicle rear cannot be increased (that is, the displacement cannot be increased).

Also, the technique disclosed in the '395 Publication has an advantage that a working load for rearward movement of a central support part can be predicted certainly with only setting an elasticity of spring respect to the impact load, the central support part always moves rearward, and the operation is certain.

However, the technique disclosed in this publication has a disadvantage that the movability of the movable frame with respect to the fixed frame near the lower part position is very poor, so that all of the seated body cannot sink to the rear side of vehicle because the fixed frame and the movable frame are fixed to each other by a mounting shaft in the lower part. Also, the spring of this publication has a problem in that the spring is made difficult to move by a reaction force that becomes high as the spring moves significantly, and also the movable range of the movable frame with respect to the fixed frame is extremely limited, so that it is difficult to secure displacement that sinks the body significantly. Since the movable frame is used, the apparatus increases in size as a whole, and therefore this technique also has a disadvantage that it is difficult to reduce the weight.

Further, the technique disclosed in the '522 Publication is a technique in which for the upper side link, one end (rear end) of a first link rod that is a part of the upper side link is attached to a movable-side bracket fixed to both of the right and left ends of the headrest mounting rod by a shaft, the other end of the first link rod is rotatably attached to a fixed-side bracket provided above both of the right and left sides of the seat back frame by a shaft, one end of a second link rod is pivotally mounted to the movable-side bracket below the first link rod by a shaft, the middle part of the second link rod is rotatably attached to the fixed-side bracket by a shaft, and further a plate body is attached so as to be movable back and forth via wire springs provided in parallel with each other in the up and down direction. In this technique, the tip end of a mounting end part on both of the right and left sides of the wire spring is positioned in front of the plate body in a plan view, so that a large space in which the cushion material can be installed can be provided between the tip end of the mounting end part and the plate body, and the cushioning performance can be improved.

In the technique disclosed in this publication, however, in order to make the headrest rotatable in a predetermined range, an inhibition part for regulating the rotating must be provided on the link rod and the like constituting the upper side link. Also, in the technique disclosed in this publication, the other end of the spring (one end of which is locked to the seat back frame side) is locked to the lower part of the first link rod, and a return spring for urging the upper side link is disposed so that the headrest is always positioned on the rear side. Therefore, if the diameter of the seat back frame is increased by the presence of the back return spring arranged above, the presence of the spring becomes a hindrance, so that the degree of freedom in designing is hindered.

Thus, a link mechanism is formed by using many members including the upper side link consisting of the plurality of link bars. Therefore, this technique has a disadvantage that not only the number of parts increases, but also the link itself increases in size.

In the techniques disclosed in that publications discussed above, a way to transmit the impact load to the headrest is needed. Therefore, these techniques have a problem in that the decrease in size and weight cannot be achieved because the configuration is intricate and has an increased size.

Also, in a technique in which a pressure receiving member is attached to the seat frame using the wire to move the headrest, the posture is held by the pressure receiving member, and the headrest is moved by a load created in the pressure receiving member, so that the deformation of a wire serving as a connecting member must be prevented as far as possible. Since the wire is not deformed, the sinking amount is hindered. Therefore, this technique has a disadvantage that it is difficult to increase the displacement, and the coexistence with a normal seating feeling is difficult to achieve.

Further, there has been known a link mechanism in which the position of a link member before operation is maintained by the installation of a spring on the link mechanism, and after operation, the link member returns to the original position.

Unfortunately, in the technique in which the position of the link member is held by using the spring, at the time of operation, in a case where the shaft center of the link member laps on the line connecting both ends of spring, even if the spring is going to return to the original state, the operation shaft does not always rotate to the return direction, and therefore may get stuck and become immovable.

SUMMARY

An object of the present invention is to provide a vehicle seat that increases the sinking (moving) amount of the passenger's body to the vehicle rear at the time of rear-end collision by a simple configuration and stopping the rotating of a shock reducing member, which is rotated by an impact load, with certainty and stably.

Another object of the present invention is to provide a vehicle seat in which a shock reducing member is in an optimum state under a usual seating load and in rear-end collision is provided, the shock reducing member is prevented from being stuck and becoming immovable, and the operation is performed reliably.

Still another object of the present invention is to provide a vehicle seat in which greater rigidity than necessary is not needed, the number of parts is small, a decrease in size and weight can be achieved, the construction is simple, the cost is low, the degree of freedom in designing is secured, and a shock to the passenger's body, neck, and the like at the time of rear-end collision can be reduced with certainty and effectively, independently from a headrest.

To achieve the above objects, various embodiments of the present invention provide a vehicle seat comprising a seat back frame comprising parts located on both sides and an upper part disposed above; a headrest disposed above the seat back frame; a pressure receiving member connected to the seat back frame via a connecting member; and a shock reducing member that is disposed at least on one side of the both-side side parts of the seat back frame, is connected to the connecting member, and is rotatable around a rotating shaft by a predetermined impact load applied to the pressure reducing member, wherein the shock reducing member comes into contact with the seat back frame to inhibit the rotating.

Therefore, as compared with a case where a rotate inhibiting member (for example, a stopper pin) is provided to hinder the rotating, the rotating can be inhibited by the seat back frame having high rigidity, the rotating can be inhibited with certainty and stably, and the number of parts can be decreased.

Also, the seat back frame with which the shock reducing member comes into contact is preferably the side part. If the configuration is made such that the shock reducing member comes into contact with the side part, the upper part of the seat back frame need not be increased in size, and the construction near a portion in which the headrest is attached to the seat back frame can be simplified.

More preferably, the configuration is made such that the side part has a flat plate-shaped side plate, and a rear edge part bent to the inside in an L shape from an end part located on the vehicle rear side of the side plate, and the shock reducing member comes into contact with the rear edge part to inhibit the rotating.

By this configuration, a rotate inhibiting member (for example, a stopper pin) need not be provided separately, the shock reducing member is supported by being brought into contact with the wall surface of the rear edge part bent to the inside in an L shape, and the rotating is stopped stably.

At this time, it is preferable that the shock reducing member be integrally formed with a rotate inhibiting part, and the rotate inhibiting part come into contact with the seat back frame to inhibit the rotating of the shock reducing member.

In this case, since the rotate inhibiting part is formed integrally with the shock reducing member, a separate member for inhibiting the rotate of the shock reducing member need not be provided, so that the number of parts can be decreased, and the assembling work can be made easy. Also, even if the rotate inhibiting part comes into contact with the seat back frame, the strength of the rotate inhibiting part can be maintained, and the rotating can be inhibited with certainty and stably.

More preferably, the rotate inhibiting part of the shock reducing member includes a bend part formed by being bent in a direction parallel with the rear edge part and in a direction of separating from the side plate, and a contact part which is continuous with the bend part and bent in the direction perpendicular to the rear edge part.

If the rotate inhibiting part includes a bend part formed by being bent in the direction parallel with the rear edge part and in the direction of separating from the side plate, and a contact part which is continuous with the bend part and bent in the direction perpendicular to the rear edge part, regarding the rotate inhibiting part of the shock reducing member, the end surface side of the rotate inhibiting part comes into contact with the wall surface of the rear edge part in parallel with a distance being provided from the side plate, so that the influence of the side plate is not exerted, and the rotating can be inhibited with certainty and stably. Also, a position at which the rotate inhibiting part is formed can be selected by adjusting the bend part bent in the direction of separating from the side plate. Therefore, the degree of freedom in designing can be secured in connection with other arrangement members (for example, the connecting member).

Also, it is preferable that the rotate inhibiting part be formed on the vehicle rear side of the rotating shaft of the shock reducing member. In this case, since the rotate inhibiting part is formed on the vehicle rear side of the rotating shaft, the seat back frame can be made compact because the distance between the rotate inhibiting part and the rear edge part disposed on the vehicle rear side can be shortened. Also, a space can be secured on the front side of the rotating shaft, and other members can be arranged by utilizing this space.

Therefore, the degree of freedom in designing can be secured, and also the rotate inhibiting part can be provided at a position separate from the passenger.

Further, it is preferable that the contact position of the rotate inhibiting part and the seat back frame after the rotating of the shock reducing member be located between a horizontal line passing the center of rotating shaft of the shock reducing member and a horizontal line passing the connecting part of the connecting member and the shock reducing member.

By this configuration, the rotating can be inhibited at a position close to a load transmission part, and the increase in size of the rotate inhibiting part can be restrained. Moreover, the rotating range of the rotate inhibiting part of the shock reducing member can be secured, and also the rotate supporting point can be prevented from being passed. Therefore, setting can be performed easily so that the shock reducing member can be prevented from becoming immovable (being stuck).

Also, the configuration is preferably made such that the contact of the rotate inhibiting part with the seat back frame is made at different positions of the rotate inhibiting part before and after the rotating of the shock reducing member. Since the rotating is inhibited at different positions of the rotate inhibiting part as described above, the rotating is inhibited by contact at one point, and the contact position is fixed, so that the rotating can be inhibited stably without variation. Also, since the contact is made at different positions before and after the rotating of the shock reducing member, the rotate inhibiting state can be adjusted in relation to other members (for example, the connecting member). Therefore, the degree of freedom in designing can be secured: for example, an optimum setting range is selected by designing loads applied to the connecting member and the rotate inhibiting part for inhibiting the rotating and the like load.

Further, the configuration is preferably made such that the rotate inhibiting part comprises two contact parts that make contact before and after the rotating of the shock reducing member, and a notch part is formed between the two contact parts. In this case, since the notch part is formed between the two contact parts, the configuration is one in which the two contact parts are discontinuous. Therefore, by adjusting this notch part, the contact positions before and after the rotating can be made certain. Also, the weight of the shock reducing member itself can be reduced by the notch part.

To achieve the above objects, various embodiments of the present invention also provide a vehicle seat comprising a seat back frame comprising side parts located on both sides and an upper part disposed above; a headrest disposed above the seat back frame; a pressure receiving member connected to the seat back frame via a connecting member; a shock reducing member which is disposed at least on one side of the both-side side parts of the seat back frame, is connected to the connecting member, and is rotatable around a rotating shaft by a predetermined impact load applied to the pressure receiving member; and an urging element disposed by attaching the end parts thereof to an attachment part formed in the shock reducing member and an attachment part formed in the seat back frame, wherein the shock reducing member is formed with a rotate inhibiting part which comes into contact with the seat back frame to inhibit the rotating of the shock reducing member, and a line connecting both ends of the urging element is always located on the vehicle front side of the rotating shaft of the shock reducing member from a time before the operation of the shock reducing member to a time after the operation thereof.

Since the shock reducing member is provided in the side part of the seat back frame as described above, an urging element such as a return spring need not be disposed at a position above the seat back frame, so that the seat back frame can be decreased in size. Therefore, the degree of freedom in designing can be secured.

Further, since the configuration is made such that the line connecting both ends of the urging element is always located on the vehicle front side of the rotating shaft of the shock reducing member from time before the operation of the shock reducing member to time after the operation thereof, the urging element does not go over the supporting point of the rotating shaft, and the reaction force in the direction reverse to the extending direction can be secured. Therefore, not only the sticking can be prevented, but also the urging element can be disposed at a location, at which it can be arranged easily, on the vehicle front side of the rotating shaft. Therefore, the assembling work efficiency can be improved.

Further, it is preferable that the rotate inhibiting part be located on the side opposite to the urging element with respect to the rotating shaft of the shock reducing member. Since the rotate inhibiting part is located on the side opposite to the urging element with respect to the rotating shaft of the shock reducing member as described above, the rotating can be inhibited in a portion different from the urging element, and also the urging element and the rotate inhibiting part do not interfere with each other. Therefore, the rotating can be inhibited with certainty and stably, so that the degree of freedom in designing can be secured, and the seat back frame can be decreased more in size.

Still further, it is preferable that the shock reducing member be movable independently from the headrest, and be disposed in the side parts on both sides and be movable independently.

Since the shock reducing member is movable independently from the headrest as described above, a mechanism for transmitting a load applied to the pressure receiving member to the headrest or the like mechanism is unneeded, so that simplification can be achieved, and also the weight can be reduced. Moreover, since the shock reducing member is disposed in the side parts on both sides and movable independently, even if a torsional load twisted by the passenger's posture or a difference in collision direction or the like is applied, the displacement of the passenger can be secured while the torsion is absorbed efficiently.

Also, to achieve the above objects, various embodiments of the present invention provides a vehicle seat comprising a seat back frame comprising side parts located on both sides and an upper part disposed above; a headrest disposed above the seat back frame; a pressure receiving member which is connected to the seat back frame via a connecting member, and movable independently from the headrest; a shock reducing member which is disposed at least on one side of the both-side side parts of the seat back frame, is connected to the connecting member, and is movable independently from the headrest; an urging element connected to the shock reducing member to urge the pressure receiving member to the front side of the seat back frame; and a lock mechanism for inhibiting the movement of the shock reducing member, wherein the lock mechanism releases the inhibition of movement of the shock reducing member on account of the application of a shock having a certain or larger magnitude from the rear, and thereby allows the movement of the shock reducing member against the urging element.

Due to the use of the above-described lock mechanism, the shock reducing member does not move or rotate in the load region in which the usual seating load is applied, and by the application of a shock having a certain or larger magnitude from the rear, the inhibition of movement of the shock reducing member is released, and the shock reducing member is allowed to move against the urging element. Therefore, no influence is exerted on the seating feeling at the usual (normal) seating time, and the seating feeling can be kept good. Also, the shock reducing member can be operated with certainty by a shock having a certain or larger magnitude.

Also, the lock mechanism is preferably disposed in the side part of the seat back frame. By providing the lock mechanism in the side part in this manner, the lock mechanism can be disposed close to the shock reducing member, and thereby the seat back frame can be decreased in size.

Further, if the lock mechanism is disposed on the vehicle lower side of the arrangement position of the shock reducing member, the lock mechanism can be provided in a relatively large arrangement region under the shock reducing member.

At this time, it is preferable that the shock reducing member be provided with a rotatable shaft part, and the lock mechanism be provided with a contact part that comes into contact with the shock reducing member to inhibit the rotating of the shock reducing member until a shock having a certain or larger magnitude is applied from the rear. If the contact part is provided in this manner, the center of gravity of the lock mechanism can be located at a high position. Therefore, the start of movement can be adjusted, and the operation performed by a shock having a certain or smaller magnitude can be prevented with certainty and the operation can with certainty be performed by a shock having a certain or larger magnitude.

More specifically, the configuration may be made such that the lock mechanism is configured so that when the shock reducing member is rotated by the application of a shock having a certain or larger magnitude from the rear, the contact part of the lock mechanism is separated from the shock reducing member by an inertial force against the movement of the shock reducing member, and the shock reducing member is allowed to move against the urging element.

For example, in the case where the shock reducing member is urged in the counterclockwise direction, and the lock mechanism is going to move clockwise, the contact part of the lock mechanism and the shock reducing member come into contact with each other, and therefore the lock mechanism inhibits the movement of the shock reducing member. When a shock having a certain or larger magnitude is applied from the rear, the contact part of the lock mechanism disengages from the shock reducing member and the shock reducing member rotates, so that the passenger's upper body can be allowed to sink with certainty in the seat back.

At this time, the configuration is preferably made such that the lock mechanism is provided with a lock urging element for urging in the direction such that the rotating of the shock reducing member is inhibited, and the contact part of the lock mechanism is brought into contact with the shock reducing member by being urged by the lock urging element. If the lock urging element is provided in the lock mechanism in this manner, the shock reducing member and the lock mechanism can be configured so as to be always compressed to prevent a play.

Also, it is preferable that the lock mechanism include a rotating shaft; a contact part which is formed at a predetermined position distant from the rotating shaft and comes into contact with the shock reducing member; and a lock urging element disposed between the contact part of the lock mechanism and the side part of the seat back frame, and be disposed so as to be rotatable by the rotating shaft formed on the vehicle lower side of the contact part of the lock mechanism. By this configuration, the position of the lock mechanism is determined by the position of the rotating shaft of the lock mechanism, the position of the center of gravity, and the like, so that the optimum position can be determined.

According to the vehicle seat in accordance with various embodiments of the present invention, the sinking (moving) amount of the passenger's body to the vehicle rear at the time of rear-end collision can be increased by a simple configuration, and the rotating of a shock reducing member, which is rotated by an impact load, can be stopped with certainty and stably.

Also, the shock reducing member having an optimum state under both the usual seating load and a rear-end collision load is provided, the shock reducing member can be prevented from being stuck (becoming immovable), and the operation can be performed reliably.

Also, greater rigidity than necessary is not needed, the number of parts is small, a decrease in size and weight can be achieved, the construction is simple, the cost is low, the degree of freedom in designing is secured, and a shock to the passenger's body, neck, and the like at the time of rear-end collision can be reduced with certainty and effectively, independently from a headrest.

Further, no influence is exerted on the seating feeling at the usual seating time, and the seating feeling can be kept good, and also the shock reducing member can be operated with certainty by a shock having a certain or larger magnitude.

BRIEF DESCRIPTION OF THE DRAWINGS

The invention is described below with reference to various embodiments illustrated in the following drawing figures.

DETAILED DESCRIPTION OF THE PREFERRED EMBODIMENTS

Embodiments of the present invention will now be described with reference to the accompanying drawings. The description of the members, arrangements, and the like, described below does not restrict the present invention, and can be modified and changed variously in light of the teachings of the present invention. In this specification, a vehicle is defined as a moving object that is mounted with a seat, including a on-ground running vehicle having wheels, such as an automobile and a railroad car, and an aircraft, and a ship moving in a space excluding on the ground. A usual seating load includes a seating shock caused when a passenger sits down and a load at the time of acceleration imposed by sudden start of vehicle. A load at the time of rear-end collision is a high load imposed by rear-end collision, including a heavy rear-end collision caused by a vehicle from the rear side and a heavy collision at the time of backward running, and excludes a collision in a load region similar to the usual seating load.

First Embodiment

FIGS. 1 to 11 show one embodiment in accordance with the present invention.

Figure 1:
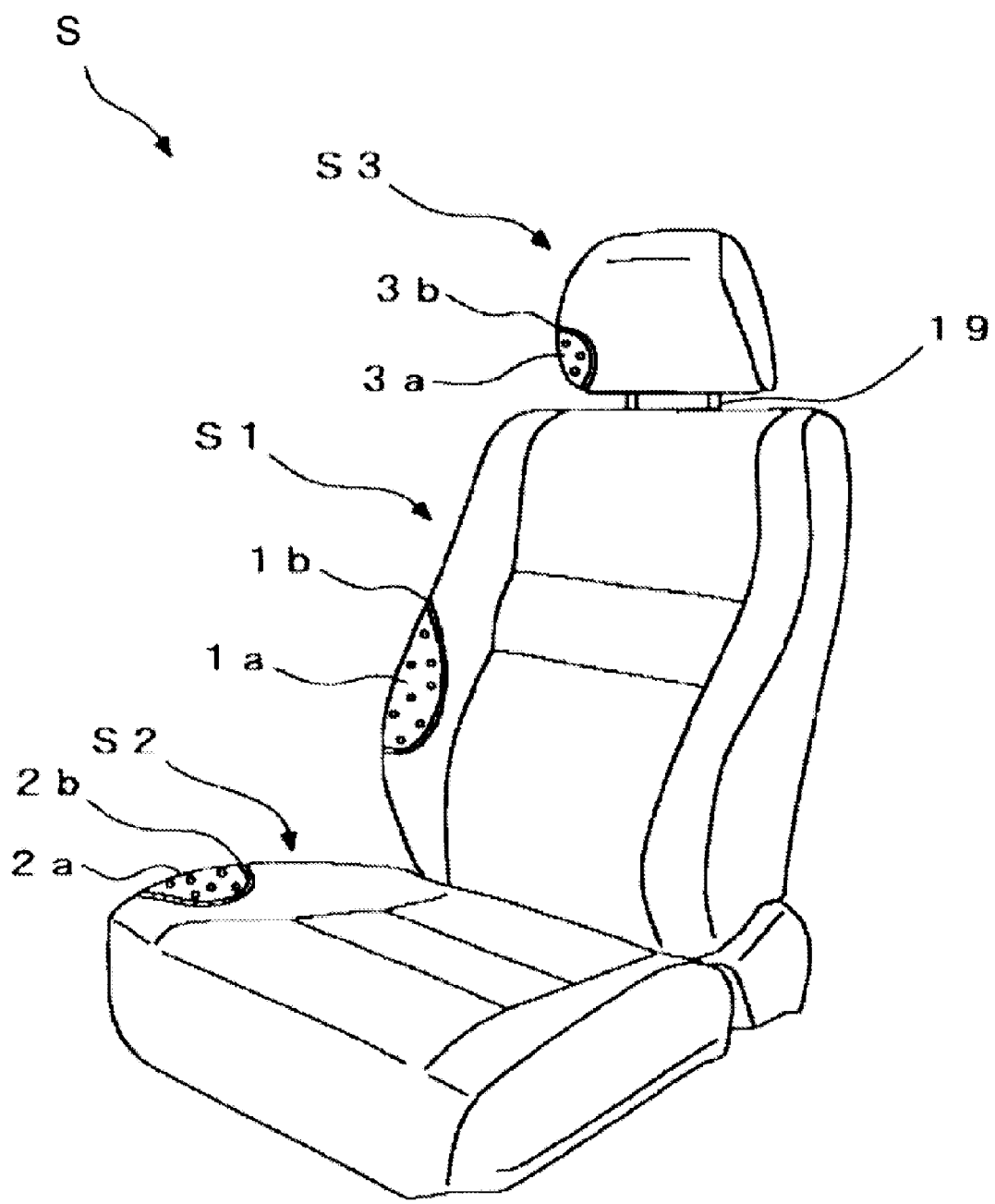
FIG. 1 is a schematic perspective view of a seat.

As shown in FIG. 1, a vehicle seat S in accordance with this embodiment is made up of a seat back S1 (a back part), a seat cushion S2, and a headrest S3. The seat back S1 (the back part) and the seat cushion S2 are formed by placing cushion pads 1a and 2a on a seat frame F and by covering the cushion pads 1a and 2a with cover materials 1b and 2b, respectively. The headrest S3 is formed by placing a pad material 3a on a core material (not shown) in the head part and by covering the pad material 3a with a cover material 3b. Reference numeral 19 denotes a headrest pillar for supporting the headrest S3.

Figure 2:
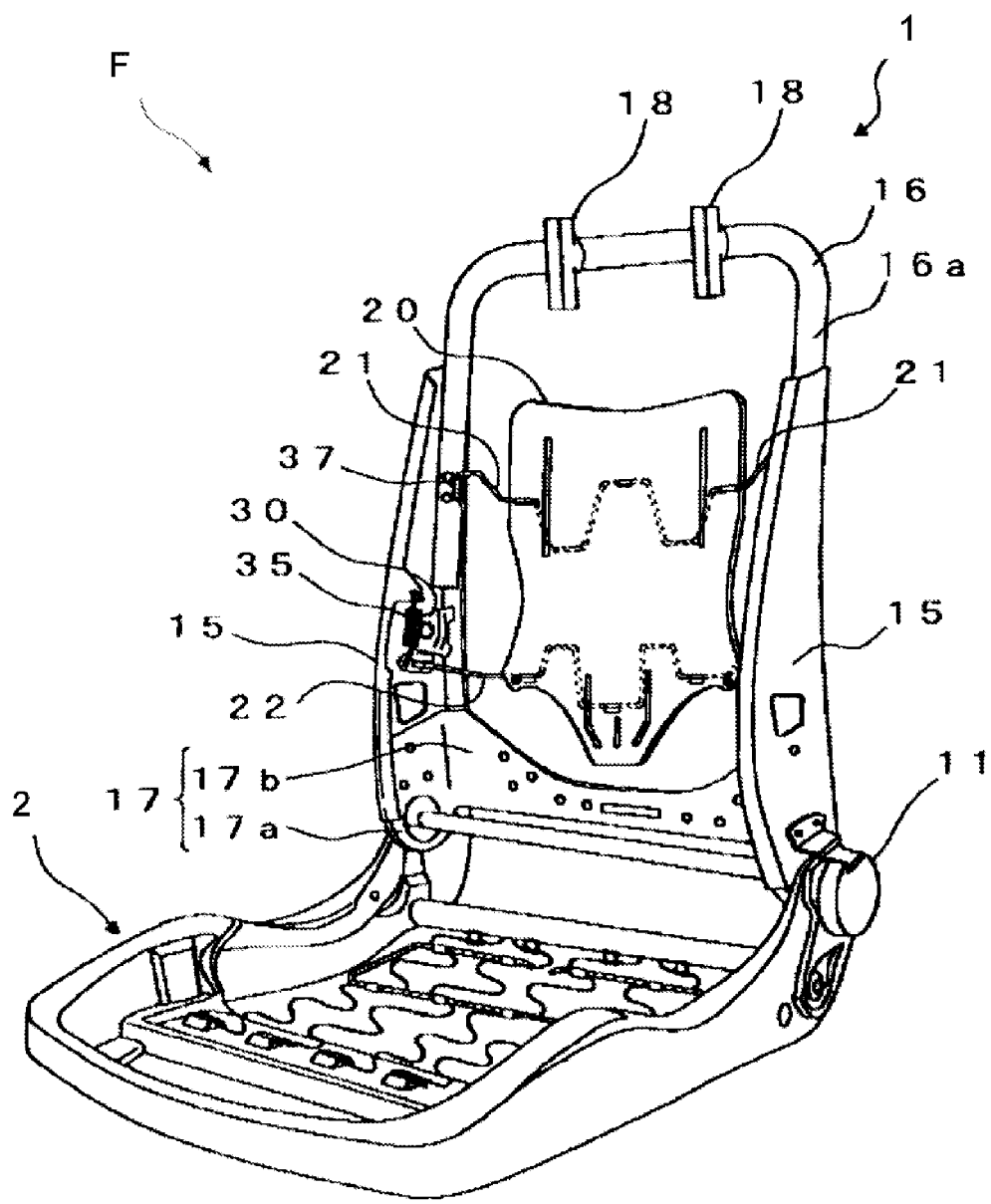
FIG. 2 is a schematic perspective view of a seat frame.

As shown in FIG. 2, the seat frame F of the vehicle seat S is made up of a seat back frame 1 constituting the seat back S1 and a seat cushion frame 2 constituting the seat cushion S2.

The seat cushion S2 is formed, as described above, by placing the cushion pad 2a on the seat cushion frame 2 and by covering the cushion pad 2a with the cover material 2b, and is configured so as to support a passenger from the downside. The seat cushion frame 2 is supported by a leg part. The leg part is mounted with an inner rail (not shown), and is assembled into a slide system such that the longitudinal position of the seat cushion frame 2 can be adjusted between the inner rail and an outer rail provided on a vehicle body floor.

The rear end part of the seat cushion frame 2 is connected to the seat back frame 1 via a reclining mechanism 11.

The seat back S1 is formed, as described above, by placing the cushion pad 1a on the seat back frame 1 and by covering the cushion pad 1a with the cover material 1b, and is configured so as to support the passenger's back from the rear side. In this embodiment, as shown in FIG. 2, the seat back frame 1 has a substantially rectangular frame body, and includes a side part, an upper part, and a lower part.

The side part is disposed so as to be separated in the right and left direction to constitute a seat back width, and has two side frames 15 each extending in the up and down direction. An upper frame 16 that connects the upper end sides of the side frames 15 extends upward from the side part, and constitutes the upper part. The upper frame 16 in this embodiment is formed by a pipe member.

The lower part of the seat back frame 1 is formed by connecting the lower end sides of the side frames 15 by a lower frame 17. The lower frame 17 has an extension part 17a that is connected to the lower sides of the side frames 15 and extends in a lower portion of the lower frame 17 and an intermediate part 17b that connects both sides. The extension part 17a is extended in a no-hindrance range in connection with the seat cushion frame 2. The seat back frame 1 is formed by separate members of the side frames 15, the upper frame 16, and the lower frame 17. However, the seat back frame 1 can be formed by an integral pipe frame, an integral plate frame, or the like.

Figure 3:
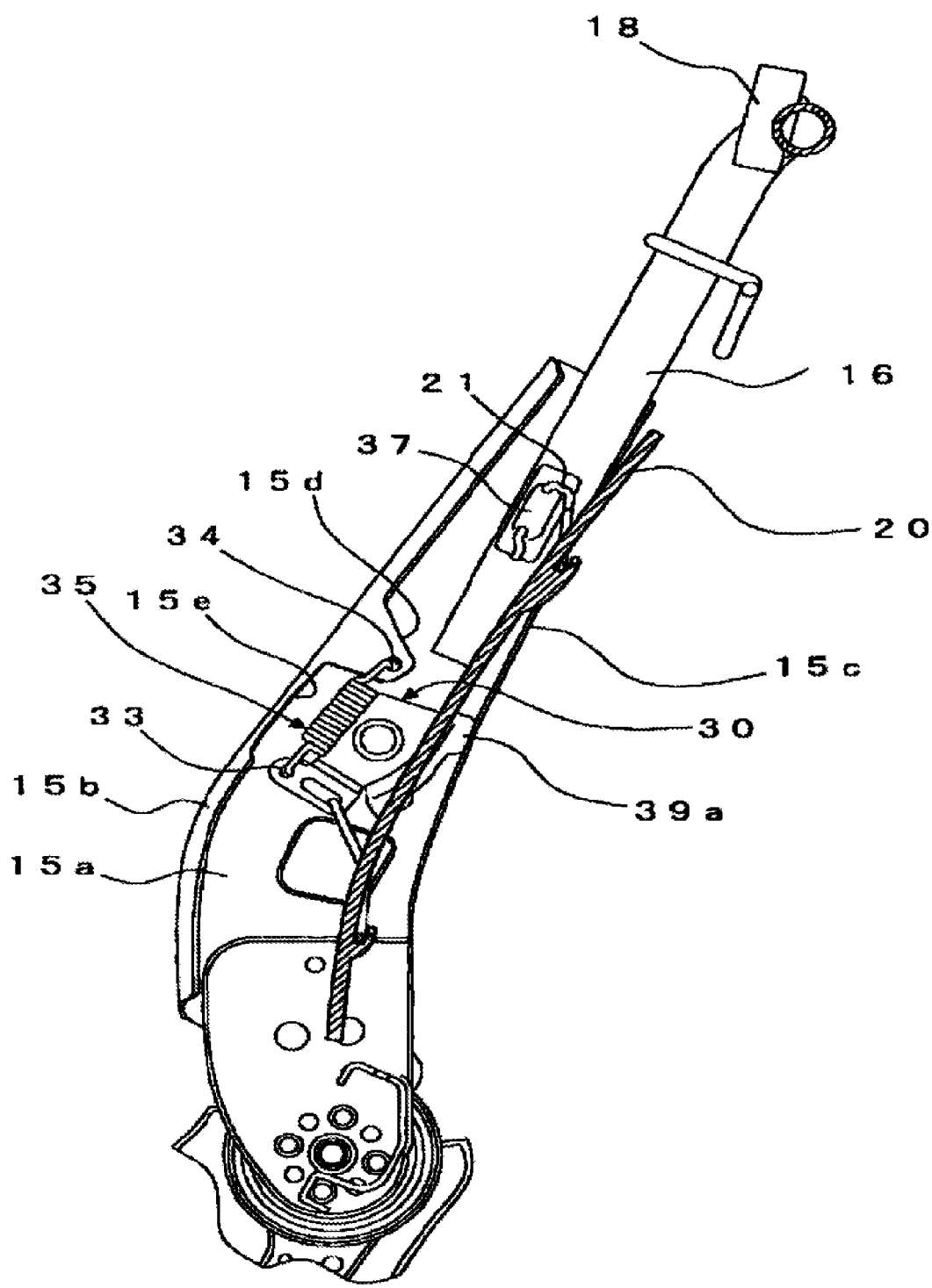
FIG. 3 is a schematic cross-sectional explanatory view of a seat back frame before the movement of a shock reducing member.
Figure 6:
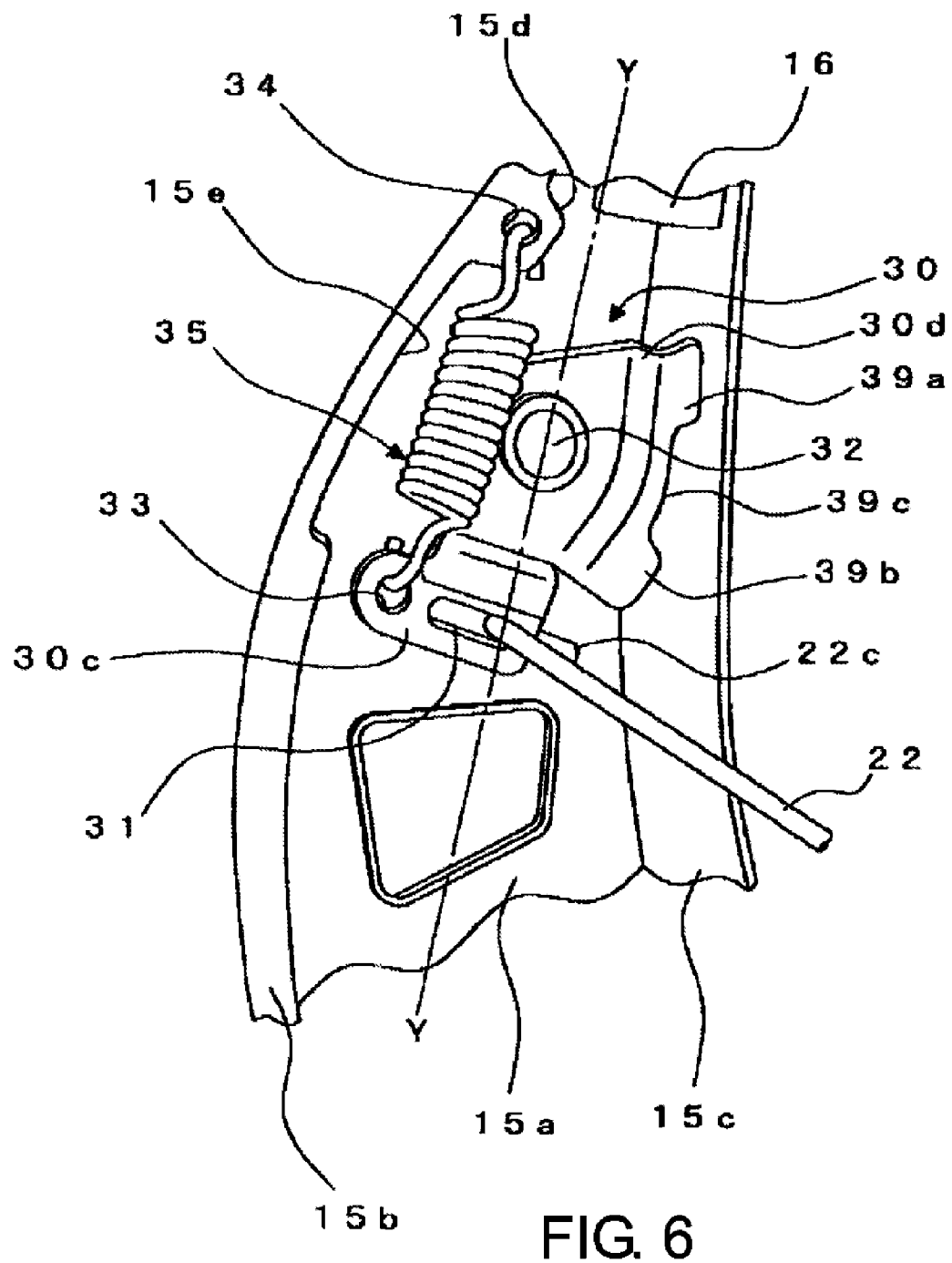
FIG. 6 is an enlarged perspective view showing the relationship between a shock reducing member and an urging element.
Figure 7:
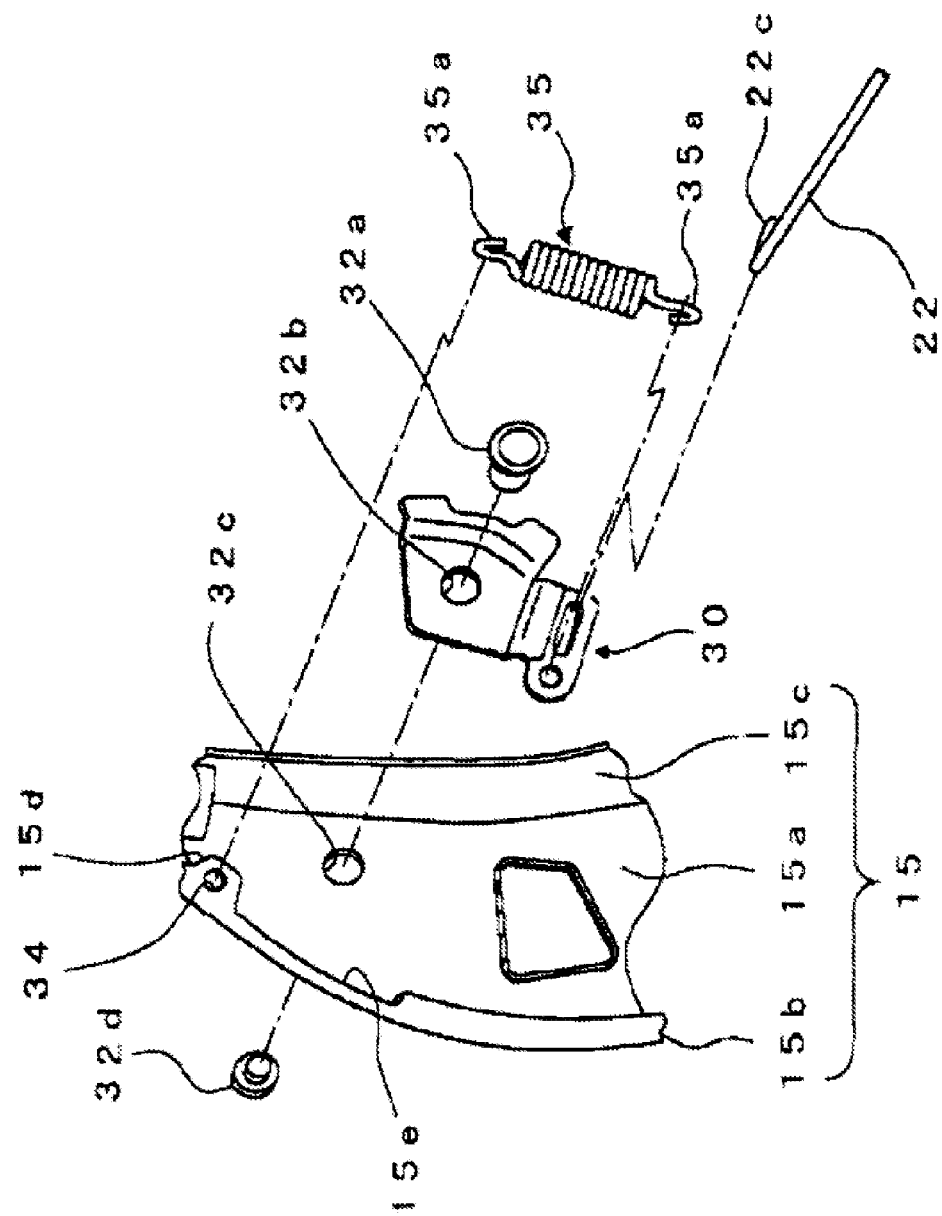
FIG. 7 is an exploded perspective view of a shock reducing member and an urging element.

The side frame 15 in this embodiment is an extending member constituting the side surface of the seat back frame 1, and, as shown in FIG. 6, has a flat plate-shaped side plate 15a, a front edge part 15b folded inward in a U-shape from the front end part (the end part located on the vehicle front side) of the side plate 15a, and a rear edge part 15c bent inward in an L-shape from the rear end part thereof. As shown in FIGS. 3, 6 and 7, the front edge part 15b of this embodiment is formed with a projecting part 15d projecting in the rear edge part 15c direction, and the projecting part 15d is formed with a locking hole 34 serving as a locking part for locking a tensile coil spring 35.

A notch part 15e, which is formed by cutting the front edge part 15b to the vehicle front side to decrease the width, is formed in the range from the lower part of the projecting part 15d of the front edge part 15b to a portion opposed to the position at which the tensile coil spring 35 serving as the urging element is disposed. By this notch part 15e, interference of the tensile coil spring 35 with the side part can be prevented even in a narrow arrangement space, and the degree of freedom of the arrangement position of the tensile coil spring 35 serving as the urging element can be secured. Moreover, an unusual sound generated by the interference of the tensile coil spring 35 with the side part caused by vibrations or the like can be restrained.

As shown in FIG. 2, the upper frame 16 is a substantially U-shaped member. Side portions 16a of the upper frame 16 are disposed so as to overlap partially on the side plates 15a of the side frames 15, and are fixedly joined to the side frames 15 in this overlapping portion.

Above the upper frame 16 constituting the upper part, the headrest S3 is disposed. The headrest S3 is, as described above, formed by placing the pad material 3a in the outer peripheral part of the core material (not shown) and by covering the outer periphery of the pad material 3a with the cover material 3b. The upper frame 16 is provided with pillar supporting parts 18. To the pillar supporting part 18, the head rest pillar 19 (refer to FIG. 1) for supporting the headrest S3 is attached via a guide lock (not shown) so that the headrest S3 is installed.

As described above, the side frames 15 constituting the side part forming a part of the seat back frame 1 have a predetermined length in the up and down direction, and are disposed in an opposing manner with a predetermined space being provided therebetween in the right and left direction. In an inside region of the seat back frame 1 in the seat back frame 1 (between the side frames 15 on both sides), a pressure receiving member 20 serving as a posture holding member that supports the cushion pad 1a from the rear is disposed.

Figure 5:
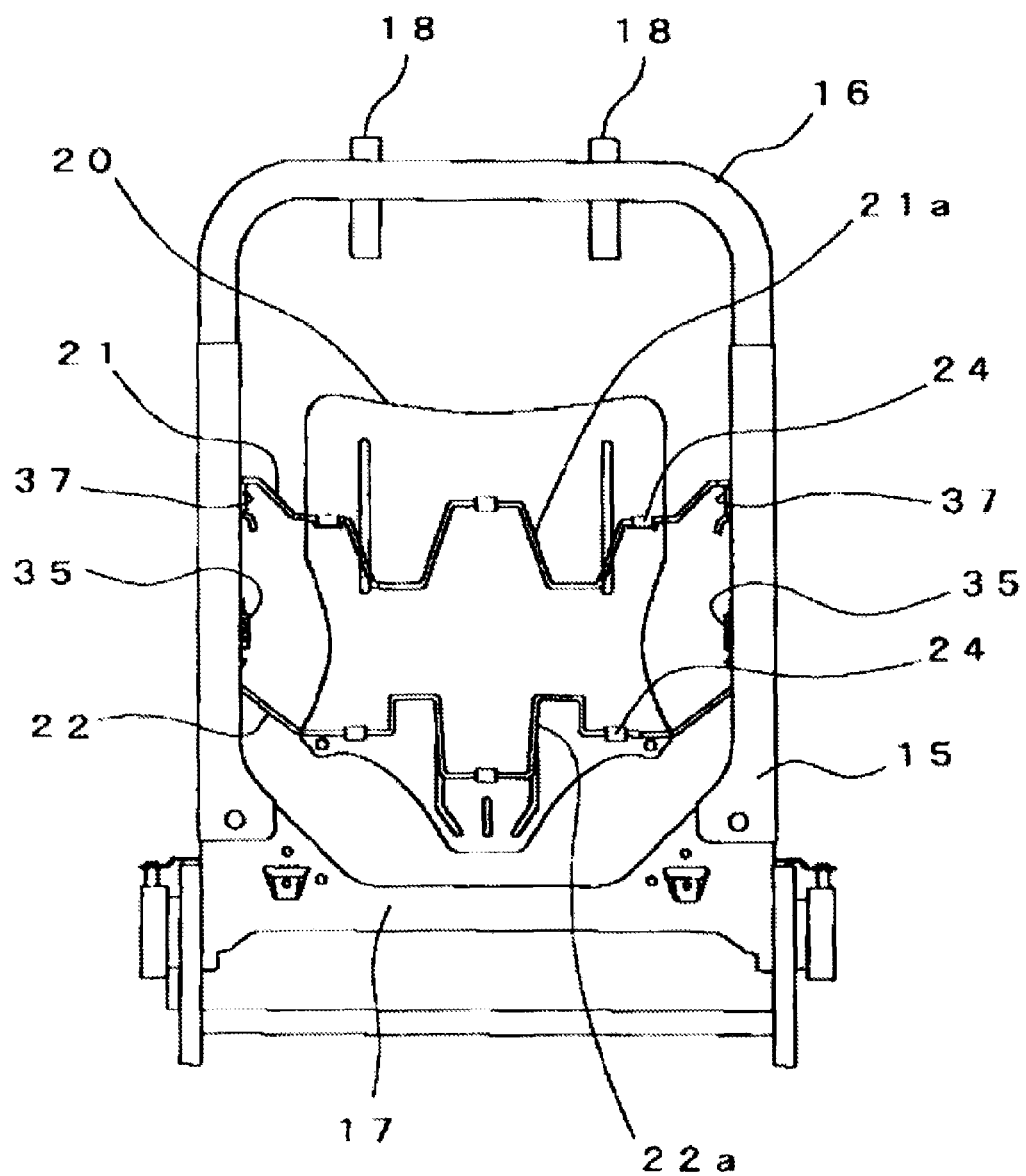
FIG. 5 is a schematic explanatory view of a seat back frame viewed from the back side.

The pressure receiving member 20 of this embodiment is configured without communication with the headrest S3. The pressure receiving member 20 is a member formed by molding a resin into a substantially rectangular plate shape, and on the surface thereof on the side in contact with the cushion pad 1a, smooth irregularities are formed. As shown in FIG. 5, on the upper side and the lower side of the back side of the pressure receiving member 20, claw parts 24, 24, . . . for locking wires 21 and 22 are formed.

The pressure receiving member 20 of this embodiment is supported by connecting members. Specifically, as the connecting members, the two wires 21 and 22 are provided between the side frames 15 on both sides, being engaged with the pressure receiving member 20 by the claw parts 24 formed at predetermined positions on the upper side and the lower side of the back side of the pressure receiving member 20, and supports the pressure receiving member 20 on the back surface of the cushion pad 1a. The wires 21 and 22 each are formed of a steel wire rod having spring properties, and, as shown in FIG. 5, are formed with irregular parts 21a and 22a, respectively, which are bend parts, in the middle between the side frames 15 on both sides.

In particular, of the two wires 21 and 22 locked to the pressure receiving member 20 of this embodiment, the wire 22 located in the lower portion is deformed greatly by a load not lower than a predetermined value (a load higher than the load of moving or rotating of the shock reducing member, described below) because the irregular part 22a is formed, and the pressure receiving member 20 is configured so as to move rearward through a larger displacement.

Figure 4:
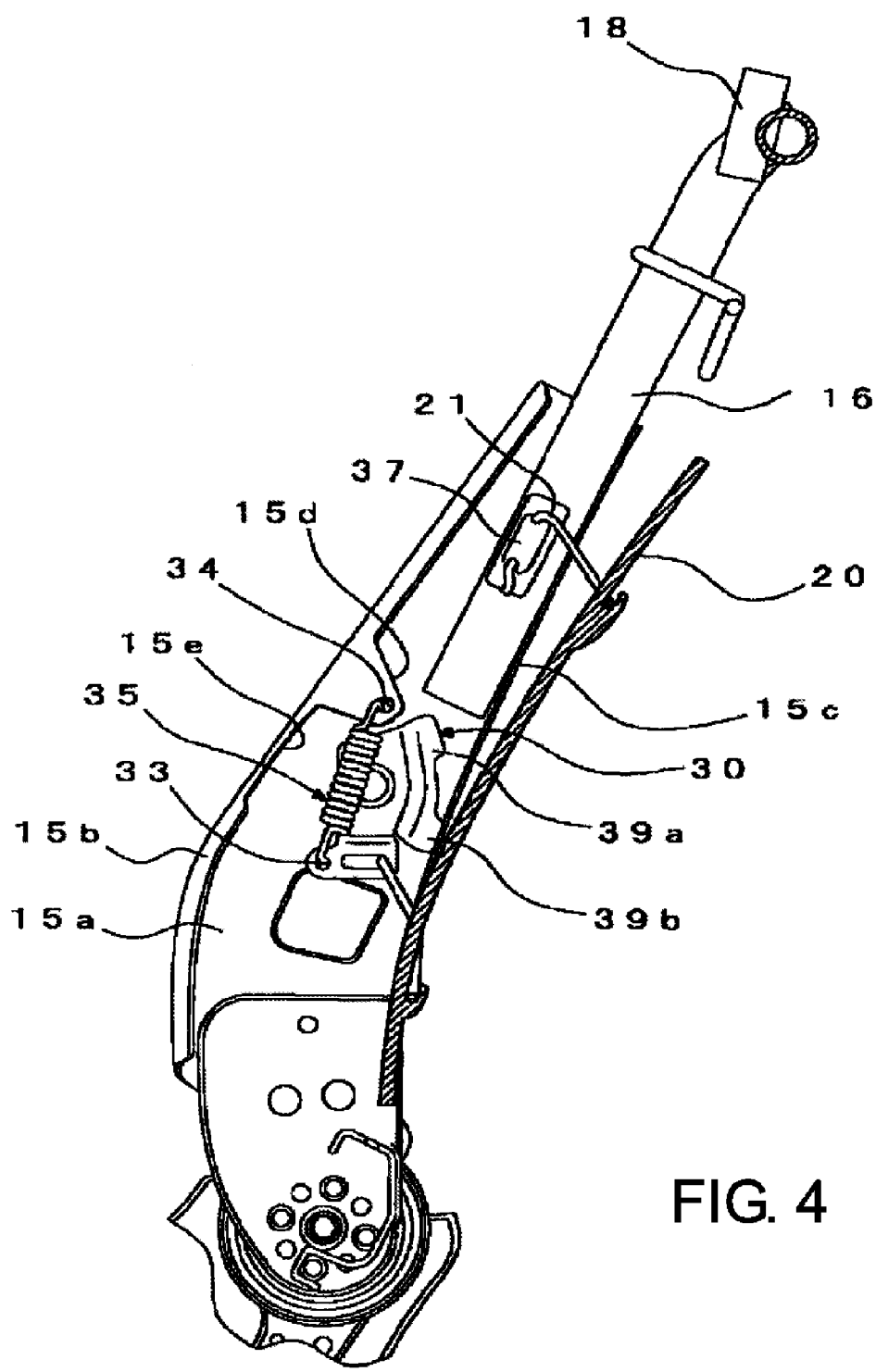
FIG. 4 is a schematic cross-sectional explanatory view of a seat back frame after the movement of a shock reducing member.

As shown in FIGS. 3, 4 and 6, of the two wires 21 and 22 locked to the pressure receiving member 20 of this embodiment, both end parts of the wire 21 locked to the upper side are hooked to mounting hooks 37 provided on the side frames 15 on both sides (in more detail, a pipe member of the upper frame 16 attached to the side frame 15). On the other hand, both end parts of the wire 22 locked to the lower side are hooked to locking parts 31 of rotating members 30 mounted on the right and left side frames 15.

The rotating member 30 serving as the shock reducing member is rotated to the vehicle rear by an impact load transmitted via the connecting member (the wire 22) when an impact load not lower than the predetermined value is applied to the pressure receiving member 20 by rear-end collision or the like. By the movement of the rotating member 30 to the vehicle rear, the pressure receiving member 20 can be moved greatly to the vehicle rear, and thereby a shock applied to the passenger can be reduced.

As shown in FIGS. 3 and 6, the rotating member 30 of this embodiment is pivotally supported on the inside of the side plates 15a of the side frames 15 on both sides via a shaft part 32 (described below) so as to be rotatable. The rotating member 30 locks the wire 22 at the lower position serving as the connecting member, and is connected to the spring (the tensile coil spring 35) serving as the urging element for urging the wire 22. That is to say, the rotating member 30 is connected to the urging element so that the pressure receiving member 20 is urged to the front side via the connecting member.

The rotating member 30 of this embodiment includes the rotatable shaft part 32, the locking part 31 for the connecting member formed at a position at a predetermined distance from the shaft part 32, a locking part (a locking hole 33) for the urging element, and a rotate inhibiting part 39 (stopper parts 39a and 39b) that inhibits the rotating.

As shown in FIG. 7, the shaft part 32 includes a shaft member 32a, a shaft hole 32b provided in the rotating member 30, a hole part 32c provided in the side plate 15a of the side frame 15, and a fitting member 32d. The shaft member 32a is inserted through the shaft hole 32b and fitted in the hole part 32c, and the fitting member 32d is fitted from the tip end side of the shaft member 32a, whereby the rotating member 30 is pivotally supported so as to be rotatable.

The locking part 31 for the connecting member (the wire 22) of this embodiment is formed into an elongated hole to make it easy to install a bent hook-shaped end part of the wire 22 serving as the connecting member. A formation part 30c of the locking part 31 is formed so as to be continuous with the outer periphery side of a base part 30a constituting the rotating member 30 and to extend in the outer periphery direction from a first rising part 30b rising from the base part 30a. The first rising part 30b is formed at a position separating through approximately 90 degrees from a position at a predetermined interval between the stopper parts 39a and 39b of the rotate inhibiting part 39 with the shaft part 32 being the center.

The locking part (the locking hole 33) of the urging element of this embodiment, which is used to lock the end part of the tensile coil spring 35 serving as the urging element, is formed on the vehicle front side of the locking part 31 in the formation part 30c in which the locking part 31 is formed. That is to say, as shown in FIG. 6, the locking hole 33 is formed at a position on the vehicle front side of a line Y connecting the shaft part 32 to a position at which the wire 22 is hooked to the locking part 31.

The urging element of this embodiment is the tensile coil spring 35 formed by coiling a spring wire rod. As shown in FIG. 6, the tensile coil spring 35 is locked to the locking hole 33 in the rotating member 30 and the locking hole 34 in the projecting part 15d of the side frame 15. Thereby, the tensile coil spring 35 urges the rotating member 30 to the front side of the seat back frame 1. In both end parts of the tensile coil spring 35, hooks 35a for locking are formed into a semicircular shape.

Figure 8:
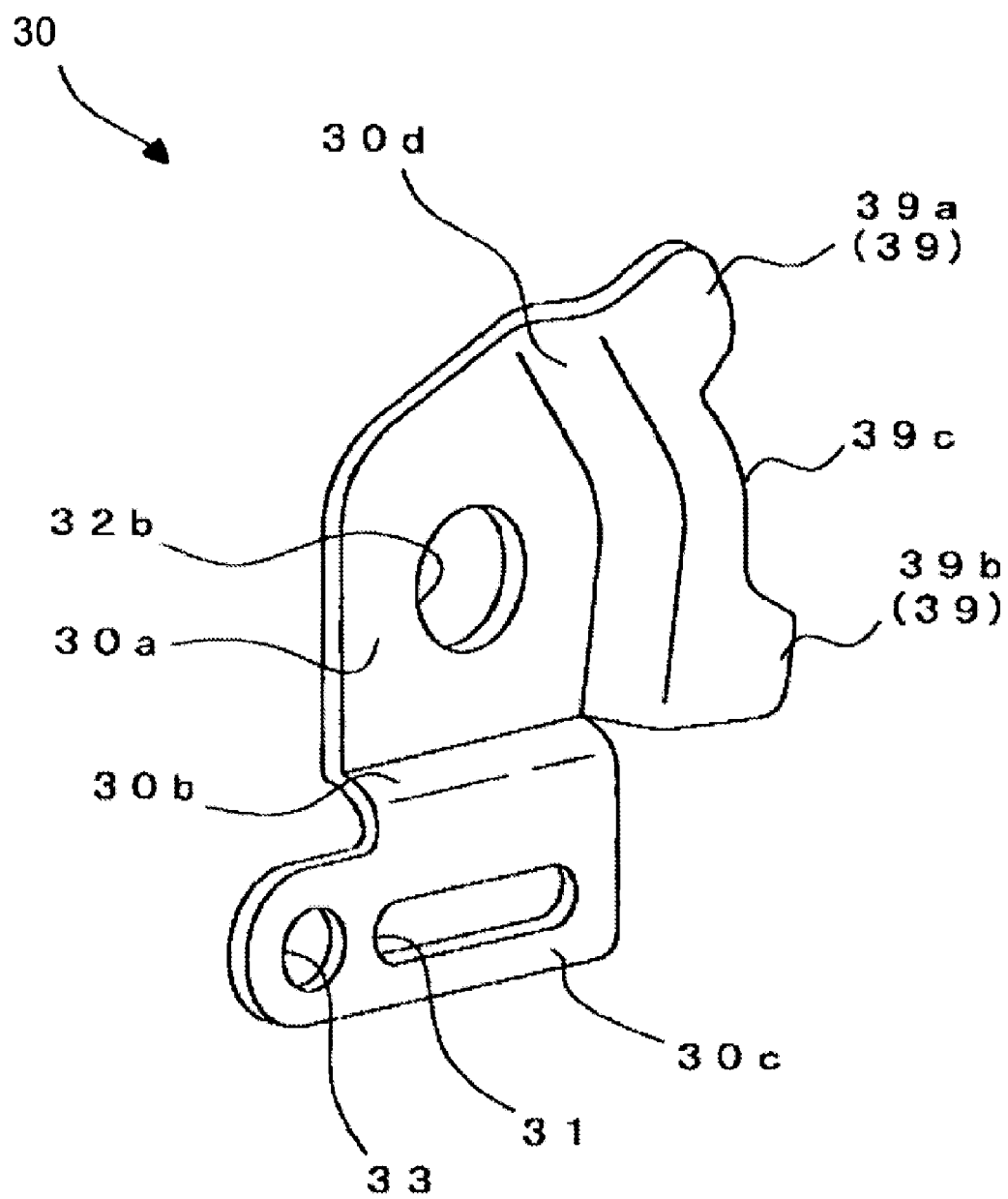
FIG. 8 is a perspective view of a shock reducing member.

As shown in FIG. 8, the rotate inhibiting part 39 (the stopper parts 39a and 39b) of this embodiment is formed at two places at a predetermined interval so as to further extend toward the outer periphery direction from a second rising part 30d rising from the base part 30a, which comes into sliding contact with the side plate 15a when the rotating member 30 rotates around the shaft part 32, so as to be continuous with the outer periphery side of the base part 30a. This extending part forms the stopper parts 39a and 39b, and a notch part 39c is formed between the stopper parts 39a and 39b. The stopper parts 39a and 39b regulate the rotating of the rotating member 30.

Specifically, as shown in FIG. 6, the second rising part 30d forms a bend part raised by being bent in the direction parallel with the rear edge part 15c of the side frame 15 and in the direction of separating from the side plate 15a, and the stopper parts 39a and 39b are further continuous with the bend part and are bent in the direction perpendicular to the rear edge part 15c. Thus, the stopper parts 39a and 39b are formed on the vehicle rear side of the shaft part 32 of the rotating member 30.

As described below, the stopper parts 39a and 39b are contact parts that come into contact with the rear edge part 15c before and after the rotating of the rotating member 30 to inhibit the rotating. The faces in the thickness direction of the stopper parts 39a and 39b being in contact with the rear edge part 15c are formed so as to be flush with the rear edge part 15c at the time of contact.

The predetermined interval between the stopper parts 39a and 39b is set so that, to regulate the rotating at the upper limit and lower limit positions of the rotate setting range of the rotating member 30, at the normal time (i.e., under normal loading), the stopper part 39a is in contact with the rear edge part 15c of the side frame 15 to inhibit the rotating of the rotating member 30, and when the rotating member 30 is rotated by rear-end collision, the stopper part 39b comes into contact with the rear edge part 15c to stop the rotating. That is to say, to regulate the rotating at the upper limit and lower limit positions of the rotate setting range of the rotating member 30, the stopper part 39a that sets the initial position before rotating and the stopper part 39b that sets the stop position after rotating are formed at the predetermined interval.

Thus, the rotate inhibiting part 39 of the rotating member 30 is integrally formed by extending the rotating member 30 toward the outer periphery direction, and the contact faces thereof come into contact with the rear edge part 15c so as to be flush therewith before and after rotating. Therefore, the rotating of the rotating member 30 can be stopped stably and with certainty by the configuration that is simple and secures the strength.

The rotate inhibiting part 39 (the stopper parts 39a and 39b) is located on the side opposite to the below-described urging element (the tensile coil spring 35) and the shaft part 32, that is, on the vehicle rear side, and therefore does not interfere with the urging element when the rotating member 30 rotates. Further, the rotate inhibiting part 39 is formed at a position at which it does not interfere with the connecting member (the wire 22).

As for the side frame 15 to which the rotating member 30 is attached, the width (the length in the vehicle longitudinal direction) of the side frame 15 in a portion in which the stopper part 39b (the rotate inhibiting part), which sets the stop position after the rotating of the rotating member 30, comes into contact with the rear edge part 15c of the side frame 15 is greater than the width (the length in the vehicle longitudinal direction) of the side frame 15 in a portion in which the stopper part 39a (the rotate inhibiting part), which sets the initial position, comes into contact with the rear edge part 15c of the side frame 15. Therefore, a high load at the time of collision can be received stably.

In this embodiment, the configuration is made such that the stopper parts 39a and 39b of the rotate inhibiting part 39 of the rotating member 30 come into direct contact with the rear edge part 15c of the side frame 15 to inhibit the rotating. However, to deaden an unusual sound generated at the time of contact, a sound-deadening member such as a rubber piece having a thickness such as not to hinder the stability of rotate stop of the rotating member 30 can be installed between the stopper part 39a, 39b and the rear edge part 15c. By this configuration, a sound-deadening effect can be anticipated while stable rotate inhibition can be achieved.

The above-described rotating member 30 is attached to the side frames 15 on both sides, and hook parts 22c of both end parts of the wire 22 are hooked to the locking parts 31 of the rotating members 30 so that the rotating members 30 operate individually. Also, the rotating members 30 are configured so as to operate independently from the headrest S3.

In this embodiment, the rotating members 30 are attached to the side frames 15 on both sides, and these rotating members 30 attached to both sides are configured so as to rotate independently from each other. Therefore, when an off-center load is applied, the rotating members 30 rotate independently in the side parts on both sides according to the load, so that the passenger's body can be sunk according to the magnitude of impact load.

At the usual seating time when the passenger is seated normally, a tension that rotates the rotating member 30 to the rear via the cushion pad 1a, the pressure receiving member 20, and the wire 22 in the seat back S1 is produced, and on the other hand, the tensile coil spring 35 urges the rotating member 30 so as to rotate it to the front side of the seat back frame 1. Since the tensile coil spring 35 connected to the rotating member 30 has a load property such as not to deflect in the region of load applied at the usual seating time, the stopper part 39a on the initial position side of the rotating member 30 is always in contact with the rear edge part 15c of the side frame 15, and is stopped at the initial position. That is to say, the configuration is made such that a force for restoring the rotating member 30 to the initial state against a force for rotating the rotating member 30 becomes greatest at the usual seating time.

Figure 9:
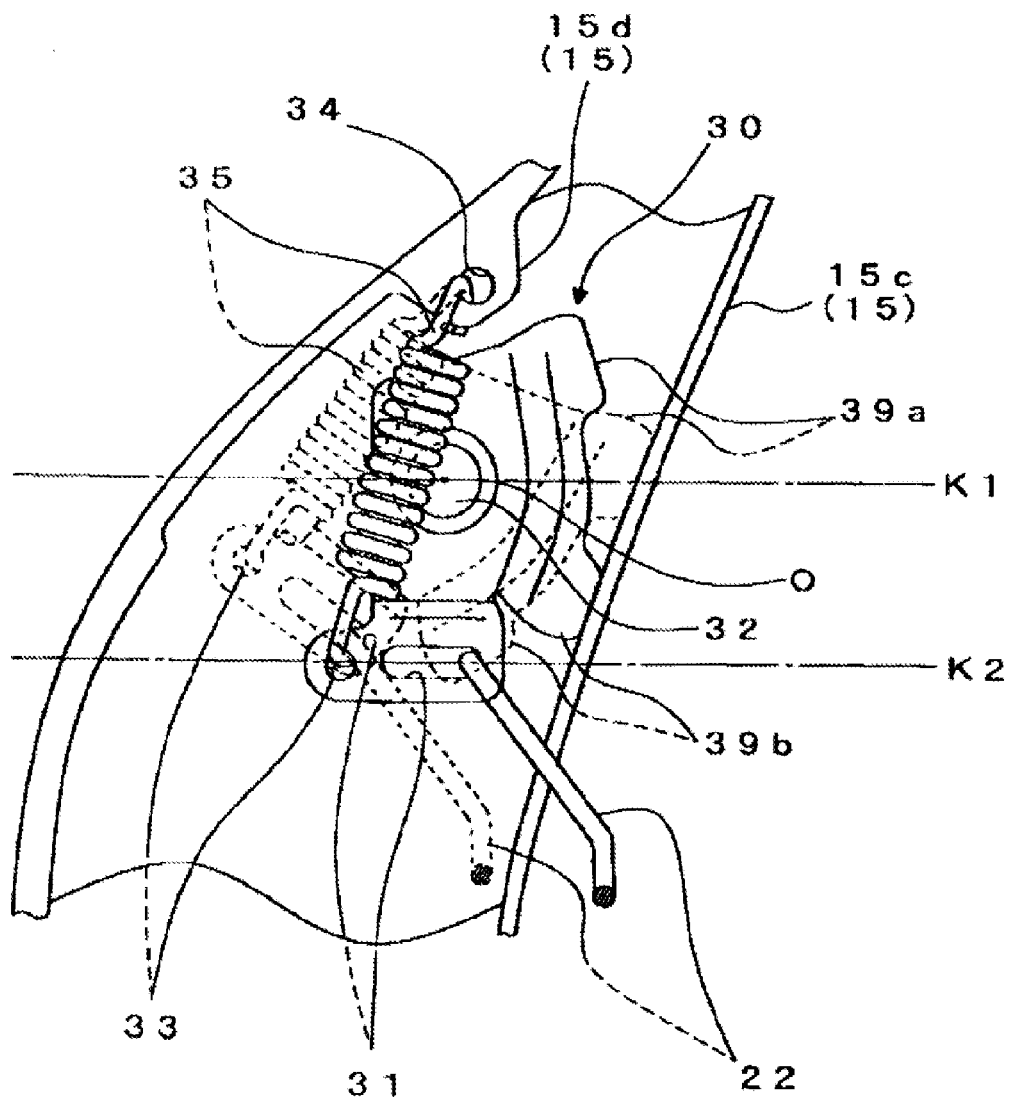
FIG. 9 is a side explanatory view showing a state of a shock reducing member and an urging element before and during rear-end collision.
Figure 10A:
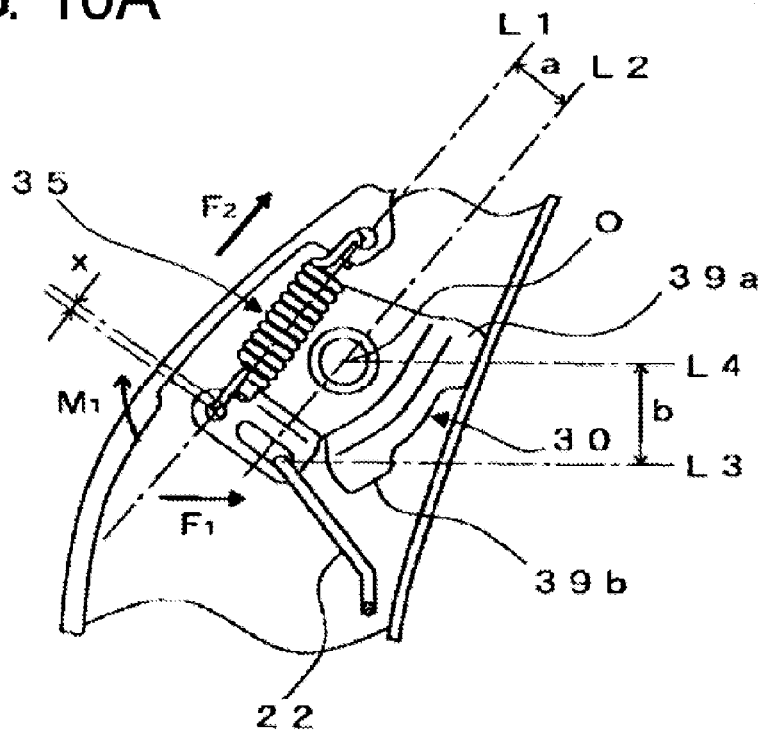
FIGS. 10A, B are side explanatory views showing a state of a shock reducing member and an urging element before and during rear-end collision.
Figure 10B:
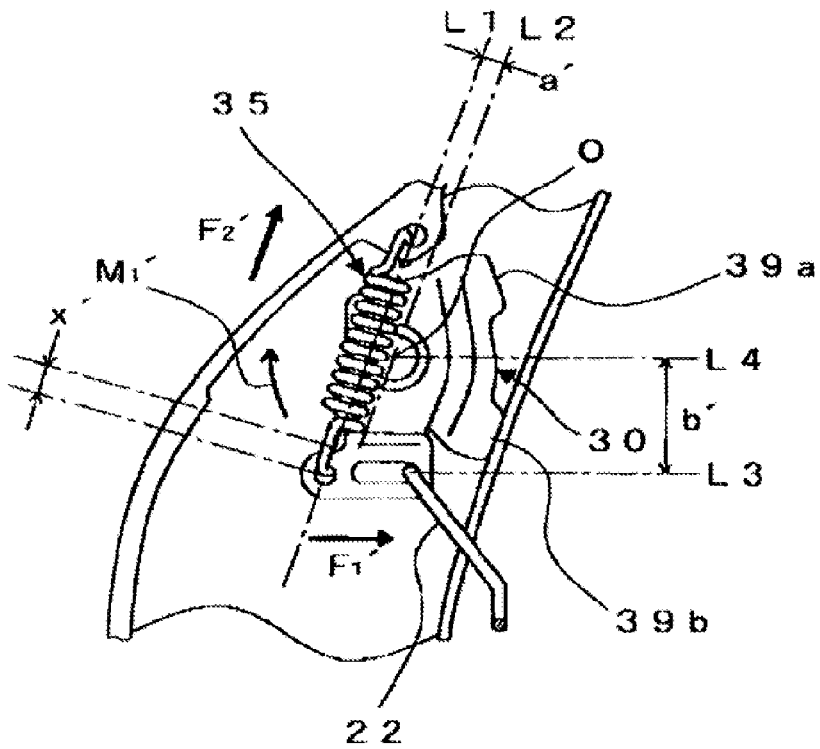

For the rotating member 30 at the time of rear-end collision, FIG. 3 shows the state before the shock reducing member rotates, and FIG. 4 shows the state after the shock reducing member rotates. In FIG. 9, broken lines indicate the state before rear-end collision, and solid lines indicate the state during rear-end collision. In FIG. 10, FIG. 10(a) shows the state before rear-end collision, and FIG. 10(b) shows the state during rear-end collision. At the time of rear-end collision, as shown in FIGS. 9 and 10, when an impact load is applied from the rear and the passenger is going to move to the rear due to the inertia, this load produces a tension such that the rotating member 30 is rotated to the rear (in FIGS. 9 and 10, to the right-hand side) via the pressure receiving member 20 (not shown in FIGS. 9 and 10) and the wire 22 locked to the pressure receiving member 20. The tension produced at this time is sufficient for the tensile coil spring 35, which allows the rotating member 30 to stay at the initial position, to extend and for the rotating member 30 to rotate to the rear.

The threshold value of a force by which the rotating member 30 is allowed to start rotating is set at a value larger than the usual seating load.

As for the threshold value of a force by which the rotating member 30 is allowed to start rotating, the threshold value is preferably larger than 150N because the load applied to the seat back S1 in the state in which the passenger is seated normally (herein, a seating shock caused when a passenger sits down and a weak shock caused by sudden start of vehicle are excluded) is about 150N. If the threshold value is smaller than this value, the rotating member 30 moves at the usual seating time. Therefore, such a small threshold value is not preferable because of poor stability.

Furthermore, considering a seating shock caused when a passenger sits down or a load at the time of acceleration imposed by sudden start of vehicle and the like, the threshold value is preferably set at a value larger than 250N. In this case, the rotating member 30 operates only at the time of rear-end collision, so that a stable state can be maintained.

As described above, by rotating the rotating member 30 to the rear, the wire 22 hooked to the locking part 31 moves to the rear, and at the same time, the pressure receiving member 20 locked to the wire 22 and the cushion pad 1a supported on the pressure receiving member 20 move to the rear, whereby the passenger can be allowed to sink in the seat back S1.

Hereunder, the rotating characteristics of the rotating member 30 are explained in more detail with reference to FIGS. 9 and 11.

At the initial position of the rotating member 30 before rotating, the locking part 31 for locking the wire 22 and the locking hole 33 for locking the lower end part of the tensile coil spring 35 are located on the vehicle front side of the shaft part 32, and the upper end part of the tensile coil spring 35 is locked to the locking hole 34 formed in the projecting part 15d of the side frame 15 located above the rotating member 30. Also, the locking hole 33 for locking the tensile coil spring 35 is located on the vehicle front side of the locking part 31 for locking the wire 22. Since the locking hole 33 for locking the tensile coil spring 35 is located on the vehicle front side of the locking hole 31 for locking the wire 22 as described above, interference of the wire 22 with the tensile coil spring 35 can be prevented. Additionally, since the wire 22 is located at a position close to the pressure receiving member 20, the seat back S1 can be decreased in size.

That is to say, in the initial state, the tensile coil spring 35 extends through a distance x, and thereby the rotating member 30 is urged in the rotating direction indicated by an arrow mark in FIG. 10(a) by an angular moment $M_1$, and the connecting member (the wire 22) connected to the rotating member 30 is urged to the front side. At this time, the stopper part 39a of the rotate inhibiting part 39 comes into contact with the rear edge part 15c of the side frame 15, so that the rotating member 30 is restrained from being rotated in the $M_1$ direction by the tensile coil spring 35.

When a tension not lower than a predetermined value is produced in the wire 22 by rear-end collision, and the rotating member begins to rotate against the urging force of the tensile coil spring 35, the tensile coil spring 35 extends, and the locking hole 33 provided in the rotating member 30 moves to the rear while rotating around the rotate center O of the shaft part 32. At this time, since the locking part 31 of the wire 22 is located on the rear side of the locking hole 33 for the tensile coil spring 35, a load for moving the rotating member 30 to the rear is transmitted smoothly. Then, as shown in FIG. 9, the rotating member 30 is rotated until the stopper part 39b of the rotate inhibiting part 39 comes into contact with the rear edge part 15c of the side frame 15 to inhibit the rotating of the rotating member 30. Thereby, the pressure receiving member 20 is moved greatly to the rear of the seat frame 1 from the state shown in FIG. 3 to the state shown in FIG. 4, so that the sinking amount increases.

Also, the contact position of the stopper part 39b, which inhibits the rotating of the rotating member 30 after rotating, and the rear edge part 15c is located between a horizontal line K1 passing the rotate center O of the shaft part 32 and a horizontal line K2 passing the locking position (connecting position) of the wire 22 and the rotating member 30. Therefore, the rotating range of the rotating member 30 is regulated, and when the rotating member 30 rotates, the stopper part 39b is not located above the horizontal line K1 passing the rotate center O. Thereby, the direction in which the rotating member 30 is returned by the urging force of the tensile coil spring 35 is always regulated to one direction, so that the rotating member 30 is prevented from becoming immovable, that is, from being stuck.

The relationship between the rotating member 30 and the tensile coil spring 35 at the time of rotating is further explained with reference to FIGS. 9 and 11. Imaginary lines Q1 and Q2 in FIG. 11 indicate lines connecting both ends of the tensile coil spring 35 at positions before and after the rotating of the rotating member 30, Q1 denoting the position before rotating, and Q2 denoting the position after rotating. An imaginary line R indicates an arc of the rotating path and the extension line thereof of the locking hole 33 for locking the tensile coil spring 35 at the time when the rotating member 30 rotates. In FIG. 11, the illustration of the rotating member 30 and the tensile coil spring 35 before rotating is omitted.

Figure 11:
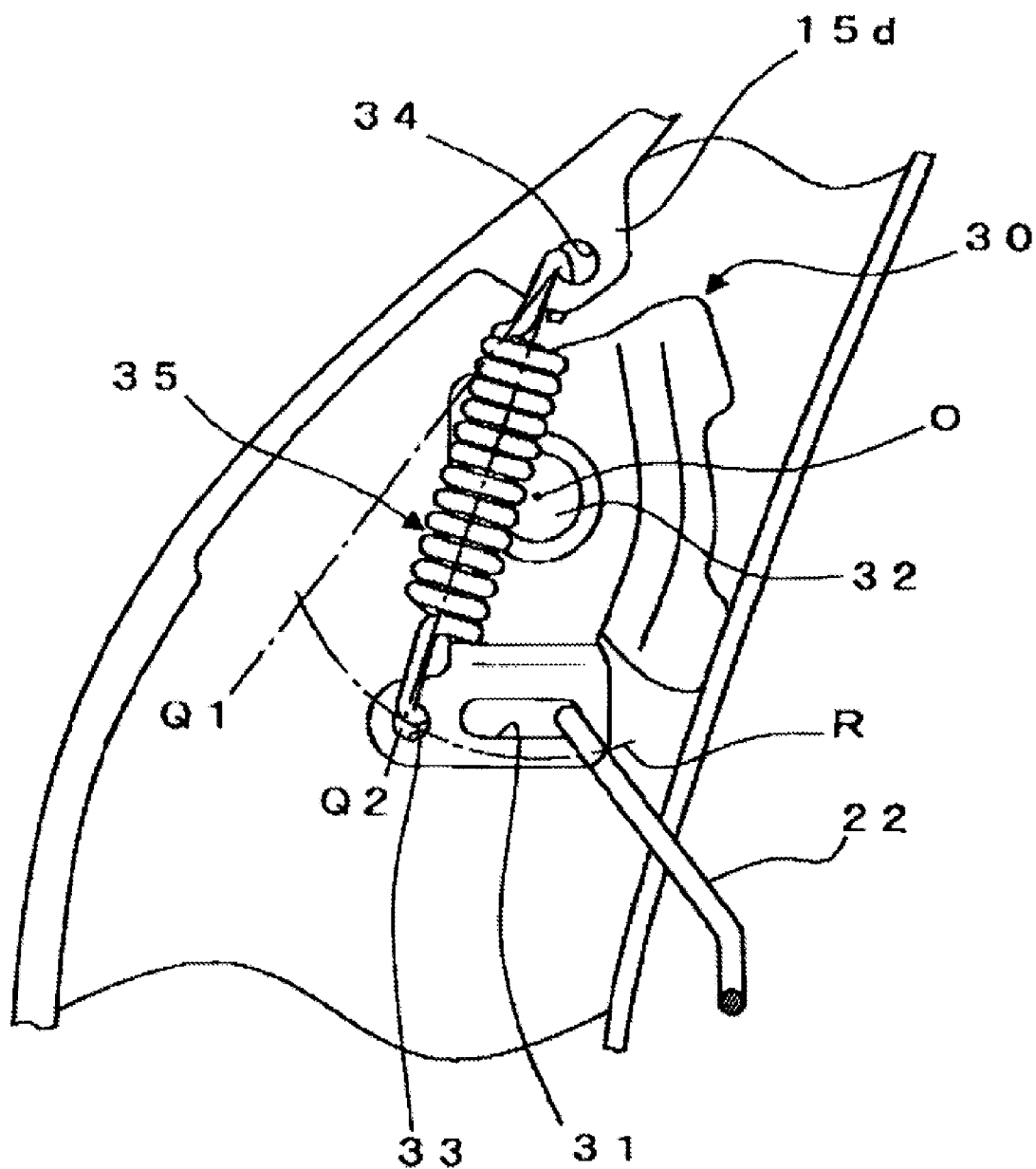
FIG. 11 is a side explanatory view showing a state of a shock reducing member and an urging element during rear-end collision.

In this embodiment, as shown in FIGS. 9 and 11, the line connecting both ends of the tensile coil spring 35 moves from Q1 to Q2 along with the rotating of the rotating member 30, but is always located on the vehicle front side of the rotate center O of the shaft part 32. Therefore, the tensile coil spring 35 does not move to the vehicle rear side beyond the rotate center O of the shaft part 32. Therefore, the rotating direction of the rotating member 30 that is rotated by the reaction force of the tensile coil spring 35 returning to the initial state is regulated to one direction, so that the rotating member 30 is prevented from becoming immovable, that is, from being stuck.

Since the locking part 31 for the wire 22 is arranged so as to be located on the rotate center O side of the rotating path of the locking hole 33 for the tensile coil spring 35, the rotating member 30 can be decreased in size. Also, the locking hole 33 for the tensile coil spring 35 is always located on the outside of the locking part 31 for the wire 22. Therefore, not only the reaction force of the tensile coil spring 35 can be utilized effectively with respect to the load of the wire 22, but also an urging element having a small urging force can be used, so that the urging element can be decreased in size.

In this embodiment, when the rotating member 30 rotates and the pressure receiving member 20 moves, the upper end part of the tensile coil spring 35 is fixed to the locking hole 34 above the rotating member 30. Therefore, the configuration is such that the movement direction of the locking hole 33 and the direction in which the tensile coil spring 35 extends do not agree with each other.

That is to say, the configuration is such that the rotating amount of the rotating member 30 is not proportional to the tensile load (deflection amount) of the tensile coil spring 35. In other words, a relationship holds such that the rotating angle of the rotating member 30 is not simply proportional to the torque (rotational force) in the front rotating direction given by the tensile coil spring 35.

That is to say, the locking hole 33 for locking the lower end part of the tensile coil spring 35 follows an arcuate path with the shaft part 32 being the rotation center, whereas the locking hole 34 for locking the upper end part of the tensile coil spring 35 is formed as a fixing end fixedly joined above the rotating member 30.

Therefore, when the rotate center O of the shaft part 32 and the locking holes 33 and 34 to which both ends of the tensile coil spring 35 are locked lay on a straight line, the tensile load (deflection amount) of the tensile coil spring 35 is at a maximum. In the vicinity of the rotating amount in which a region is just before this maximum load point, that is, the path followed by the locking hole 33 provided on the rotating member 30 side is at a position farthest from the locking hole 34 to which the other end part of the tensile coil spring 35 is locked, the change amount of the distance between the locking holes 33 and 34 to which the tensile coil spring 35 is locked is small. Therefore, a region is produced in which the change amount of the tensile load of the tensile coil spring 35 with respect to the rotating angle is minute.

In this embodiment, the rearward rotating amount of a position at which the rotating member 30 is stopped by the stopper part 39b is set to be just before the maximum load point of the tensile coil spring 35.

Therefore, comparing with the tension produced via the wire 22 at the time when the rotating member 30 begins to rotate, the tension produced when the stopper part 39b comes in contact and the rotating is restricted (when the rotating is finished) takes an approximately equal value.

Hereunder, the relationship between the urging element (the tensile coil spring 35), the connecting member (the wire 22), the shock reducing member (the rotating member 30), and the load is explained further. The symbols shown in FIGS. 10(a) and 10(b) are as follows:

$$M_1 = F_2 \times a, \quad M_1' = F_2' \times a'$$

$M_1$, $M_1'$: angular moment
$F_1$, $F_1'$: rearward load
$F_2$, $F_2'$: tensile force of spring
a, a': distance between rotate center and fixed position of urging element (spring). Specifically, distance between first imaginary line L1 connecting both ends of urging element and second imaginary line L2 that is parallel with this first imaginary line L1 and passes rotate center, a being the distance before rotating, and a' being the distance after rotating.

b, b': distance between rotate center and connecting member (wire). Specifically, distance between third imaginary line L3 parallel with horizontal line passing connecting part of shock reducing member and connecting member (wire) and fourth imaginary line L4 that is parallel with this third imaginary line L3 and passes rotate center, b being the distance before rotating, and b' being the distance after rotating.

x, x': extension of spring $F_2' = F_2 + \Delta x \times k$, in which k is spring constant, and $\Delta x = x' - x$ In this embodiment, in order to keep the seating state proper even at the usual (normal) seating time, some degree of reaction force must be provided, so that it is preferable that the working load at the collision time be low while the holding load of the rotating member 30 at the usual seating time is fixed. Therefore, the load at the time when the rotating member 30 operates is preferably set low. The reaction force against the force for rotating the rotating member 30, that is, the moment with which the tensile coil spring 35 rotates the rotating member 30 is set so as to be highest at the initial time (the usual seating time) and low at the rotating time.

In this embodiment, as shown in FIGS. 10A, B, the configuration is made such that as the rotating member 30 rotates further, the tensile coil spring 35 approaches the rotate center O, and the distance a becomes short. Therefore, the tensile coil spring 35 is used such that the angular moment $M_1$ ($F_2 \times a$) in the initial state is highest, and the angular moment $M_1'$ ($F_2' \times a'$) during rotating (and after rotating) is lower than the angular moment $M_1$, so that the angular moment for rotating the rotating member 30 is high at the initial time and decreases gradually as the rotating member 30 rotates.

For example, if the spring tensile force $F_2'$ is doubled, and the distance a' between the rotate center and the spring fixing position is shorter than a half, it can be understood that the force for rotating the shock reducing member weakens.

Thus, for the rotating member 30 serving as the shock reducing member, the angular moment $M_1$ ($F_2 \times a$) in the initial state is highest, and the angular moment $M_1'$ ($F_2' \times a'$) becomes lower than the angular moment $M_1$ as the rotating member 30 rotates, that is, the force such that the tensile coil spring 35 restores the rotating member 30 to the initial state decreases gradually. Therefore, at the time of rear-end collision, after the start of rotating, the rotating member 30 becomes easy to move subsequently.

In FIGS. 10A and 10B, in order for the rotating member 30, the tensile coil spring 35, and the connecting member (the wire 22) to be balanced in the stationary state, when the angular moment is taken as ($M_1 = F_2 \times a$), the rearward load as ($F_1$), the spring tensile force as ($F_2$), the distance between the rotate center and the spring fixing position as (a), and the distance between the rotate center and the connecting member (the wire 22) as (b), as shown in Formula 1, $F_1 \times b$: force from passenger (force for moving the rotating member 30) and $F_2 \times a$: angular moment (staying force) must be in equilibrium, or the angular moment must be high. In the case where the angular moment is high, the rotating of the rotating member 30 is inhibited by the stopper part 39a.

$$F_1 \times b \leq F_2 \times a \quad \text{(Formula 1)}$$

On the other hand, in order for the rotating member 30, the tensile coil spring 35, and the connecting member to be balanced in the state in which the rotating member 30 moves, as shown in Formula 2, $F_1' \times b'$: force from passenger (force for moving the rotating member 30) and $F_2' \times a'$: angular moment (staying force) must be in equilibrium, or the force from the passenger must be high. In the case where the force from the passenger is high, and the rotating member 30 has moved to a predetermined position, the rotating of the rotating member 30 is inhibited by the stopper part 39b.

$$F_1' \times b' \geq F_2' \times a' \quad \text{(Formula 2)}$$

As described above, the threshold value of tension at the time when the rotating member 30 begins to rotate is set at a large value such that the rotating member 30 is not rotated by the usual seating load. On the other hand, since the tension applied to the rotating member 30 via the wire 22 at the time of rear-end collision is an impact energy, the tension has a value larger than the threshold value. Also, the force such that the tensile coil spring 35 restores the rotating member 30 to the initial state decreases as the rotating member 30 rotates.

Therefore, when the rotating member 30 begins to be rotated by rear-end collision, the rotating member 30 rotates until being stopped by the stopper part 39b without being stopped on the way, so that the passenger can be allowed to sink with certainty in the seat back S1.

Since the rotating member 30 has the above-described rotating characteristics against the tension produced via the wire 22, when rear-end collision occurs, the passenger can be allowed to sink in the cushion pad of the seat back S1 with certainty and efficiently.

At this time, the passenger's back is moved to the rear by the sinking in the seat back S1, but the position of the headrest S3 is unchanged relatively. Therefore, a gap between the headrest S3 and the head decreases, and the head can be supported by the headrest S3, so that an effect of effectively reducing a shock applied to the neck is achieved.

Also, when the passenger sinks in the seat back S1, since the sinking is not associated with the frontward movement of the headrest S3, the loss of rearward movement energy of the passenger at the time of rear-end collision is low, and the passenger can be allowed to sink in the seat cushion more deeply, so that a shock applied to the neck can be reduced more effectively.

Second Embodiment

FIGS. 12 to 17 show another embodiment in accordance with the present invention. In this embodiment, the same symbols are applied to members, arrangements, and the like that are essentially the same as those in the above-described embodiment, and the explanation of these members, arrangements, and the like is omitted.

In this embodiment, a lock mechanism 50, which inhibits the rotating of the rotating member 30 until a shock having a certain or larger magnitude is applied from the rear, is provided below the rotating member 30 serving as the shock reducing member provided on the inside of each of the side frames 15 on both sides of the seat back frame 1.

Figure 12:
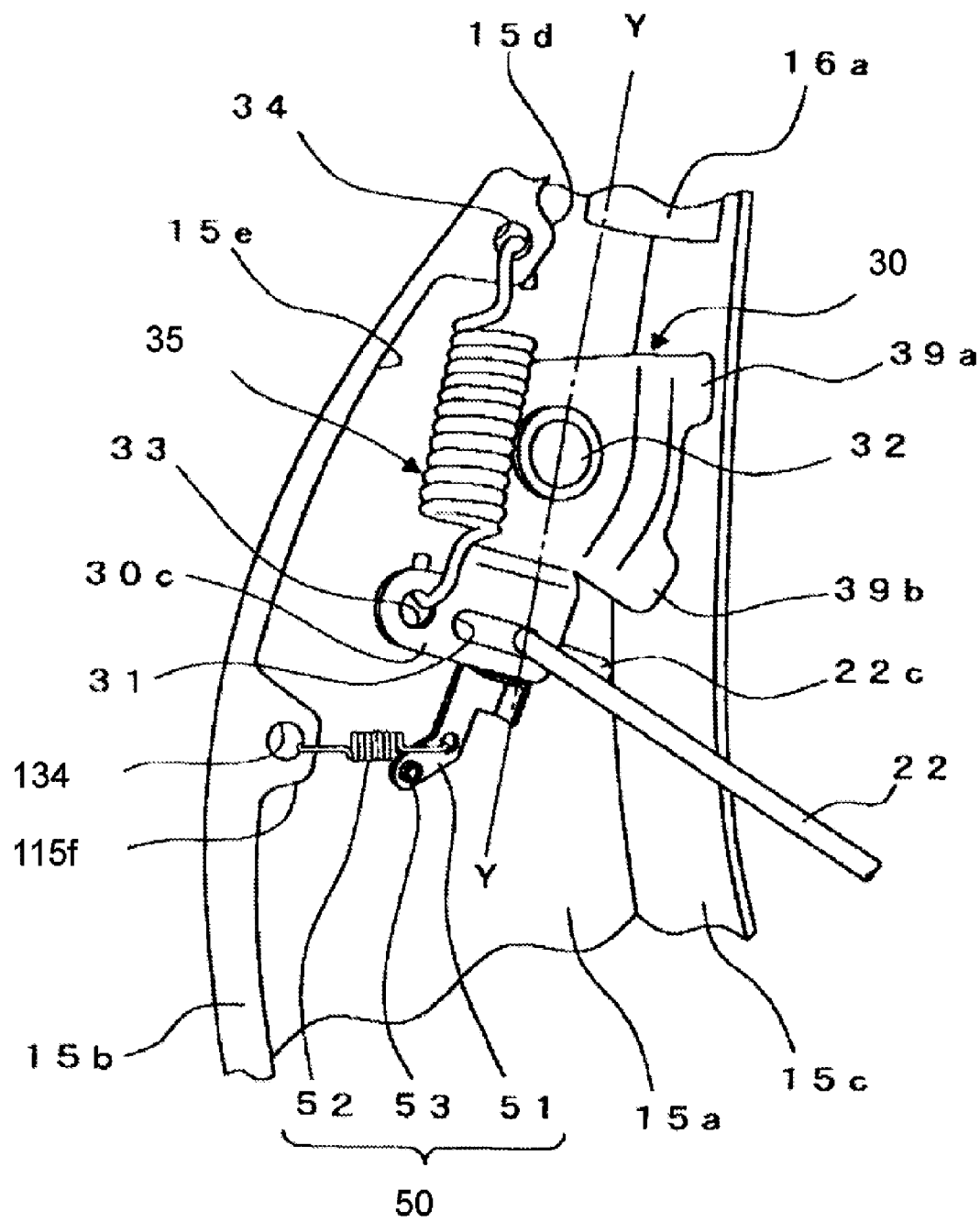
FIG. 12 is an enlarged explanatory view showing the relationship between a shock reducing member, an urging element, and a lock mechanism.

As shown in FIG. 12, in the front edge part 15b of the side frame 15 of this embodiment, a projecting part 115f projecting toward the rear edge part 15c direction is formed. The projecting part 115f is formed with a locking hole 134 serving as a lock part for locking a tensile coil spring 52 serving as a lock urging element constituting the lock mechanism 50, described below.

Figure 13:
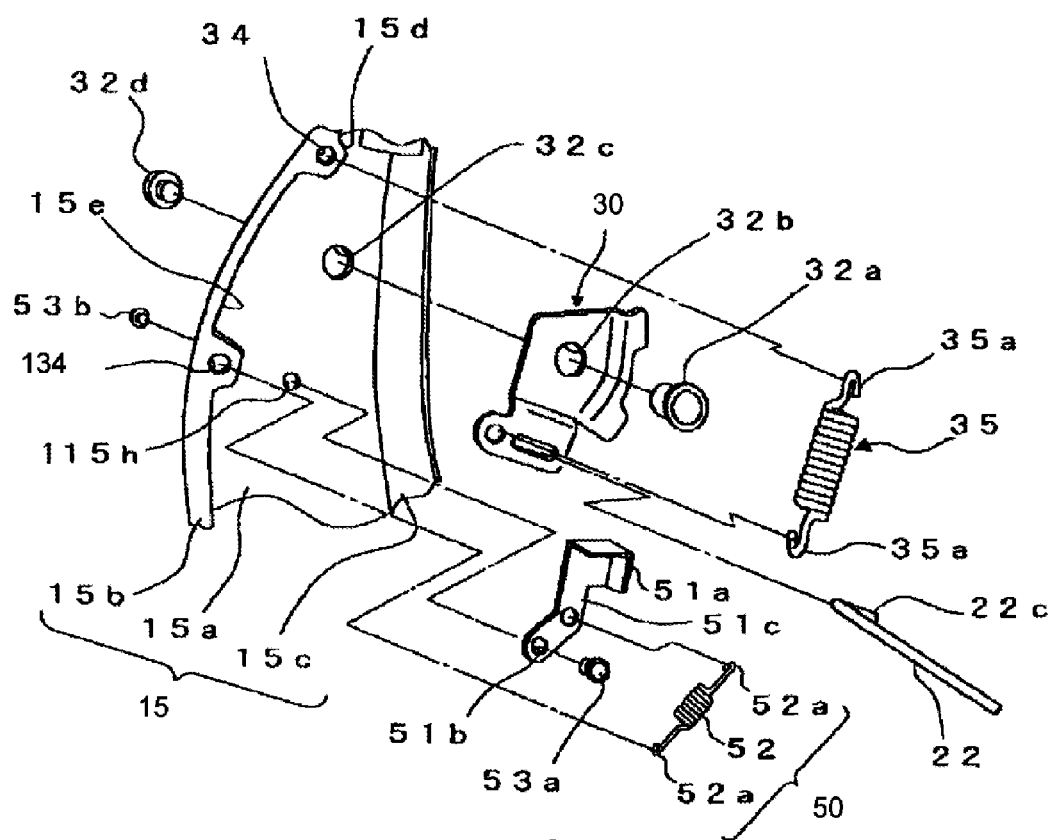
FIG. 13 is an exploded perspective view of a shock reducing member, an urging element, and a lock mechanism.
Figure 14:
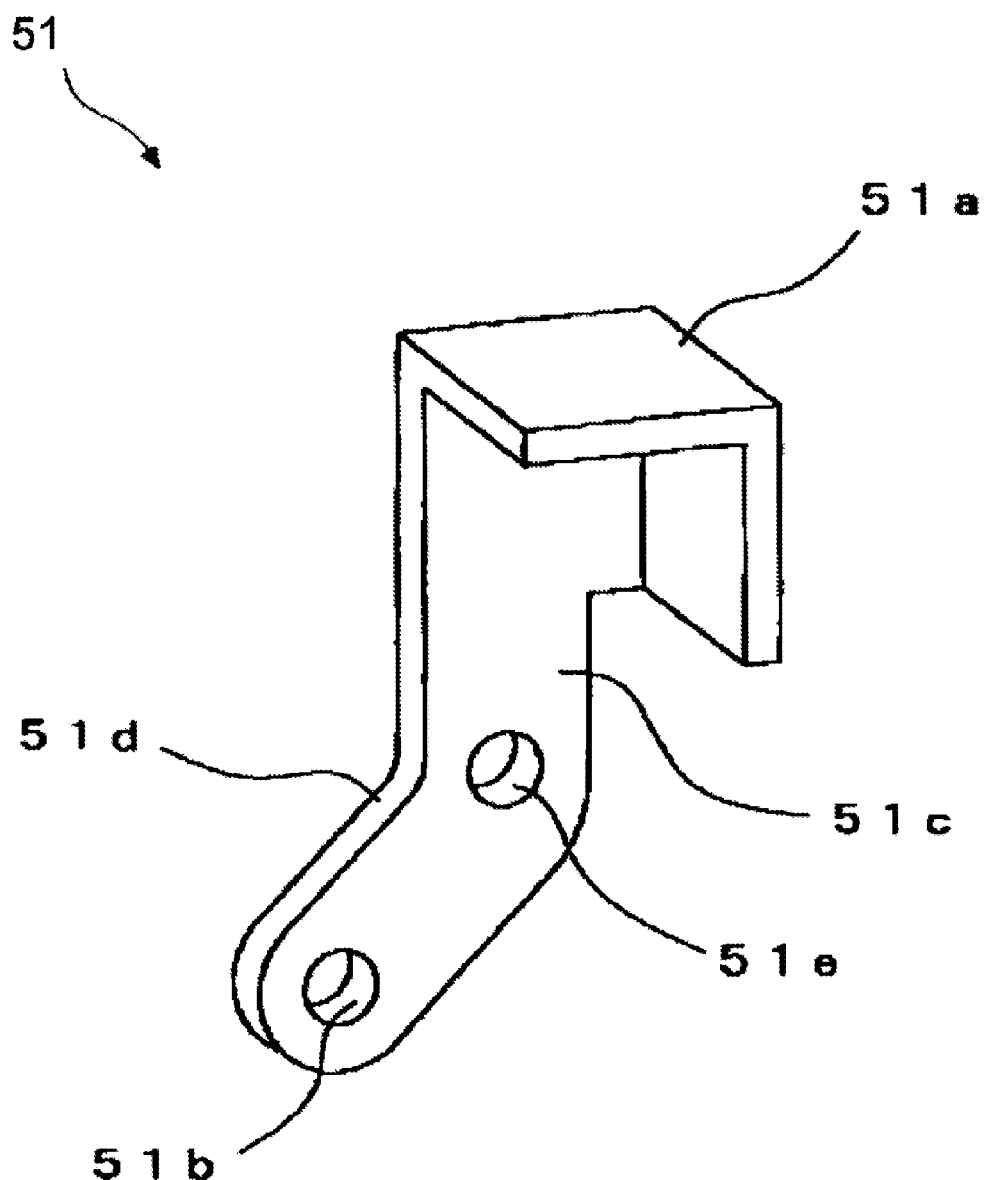
FIG. 14 is a perspective view of a lock main body.

As shown in FIGS. 12, 13 and 14, the lock mechanism 50 of this embodiment is provided at a lower position of the rotating member 30 of the side frame 15, and includes a lock main body 51, the tensile coil spring 52, and a rotating shaft 53. Thus, the lock mechanism 50 is disposed close to the rotating member 30 serving as the shock reducing member of the side frame and in a relatively large arrangement region.

The lock main body 51 of this embodiment includes a contact part 51a, a rotating shaft forming part 51b, and a connecting part 51c, which are preferably formed integrally.

The contact part 51a of this embodiment, having an inverse L-shaped cross section, is formed on one end side of the lock main body 51 so as to have a weight larger than that of other parts. The contact part 51a has a contact surface comprising a flat plane of a predetermined range so as to certainly come into contact with the rotating member 30 serving as the shock reducing member. The contact part 51a is formed into an inverse L shape so that a surface continuous from the contact surface is formed in the rotating direction (arrow-marked direction in FIG. 17(b)) at the time when the lock main body 51 rotates with the rotating shaft 53 being the center. The reason for this is that the weight in the rotating direction is secured to secure inertial force toward the rotating direction of the lock main body 51. Therefore, the contact part 51a need not be of an inverse L shape. The weight may be secured by increasing the plate thickness on the rotating direction side of the contact surface. Thus, the start of movement can be adjusted by placing the center of gravity of the lock mechanism 50 at a high position. Therefore, the lock mechanism 50 can be prevented from being operated by a shock having a certain or smaller magnitude, and can be operated with certainty by a shock having a certain or larger magnitude.

The rotating shaft forming part 51b of this embodiment is a shaft hole formed on the other end side of the lock main body 51. As shown in FIG. 13, a shaft member 53a forming the rotating shaft 53 is attached to the rotating shaft forming part 51b so as to be rotatable with respect to the side plate 15a. The side plate 15a is formed with a hole 115h in which the shaft member 53a is pivotally mounted.

The connecting part 51c of this embodiment, which connects the contact part 51a to the rotating shaft forming part 51b, is formed so as to have a predetermined length. In this embodiment, a bend part 51d is formed, and a connecting hole 51e connected to the tensile coil spring 52 serving as the lock urging element is formed on the inside of the bend part 51d of the connecting part 51c.

As the lock urging element of this embodiment, the tensile coil spring 52 formed by coiling a spring wire rod is used. In both end parts of the tensile coil spring 52, hooks 52a for locking the tensile coil spring 52 are formed into a semicircular shape. The tensile coil spring 52 urges the lock main body 51 to the vehicle front side when the lock mechanism 50 is installed at the lower position of the rotating member 30 on the inside of the side frame 15.

As shown in FIG. 13, the rotating shaft 53 of this embodiment includes the shaft member 53a, the rotating shaft forming part 51b provided in the lock main body 51, the hole 115h provided in the side plate 15a of the side frame 15, and a fitting member 53b. The shaft member 53a is inserted through the rotating shaft forming part 51b and fitted in the hole 115h, and the fitting member 53b is fitted from the tip end side of the shaft member 53a, whereby the lock main body 51 is pivotally supported to be rotatable.

Figure 15:
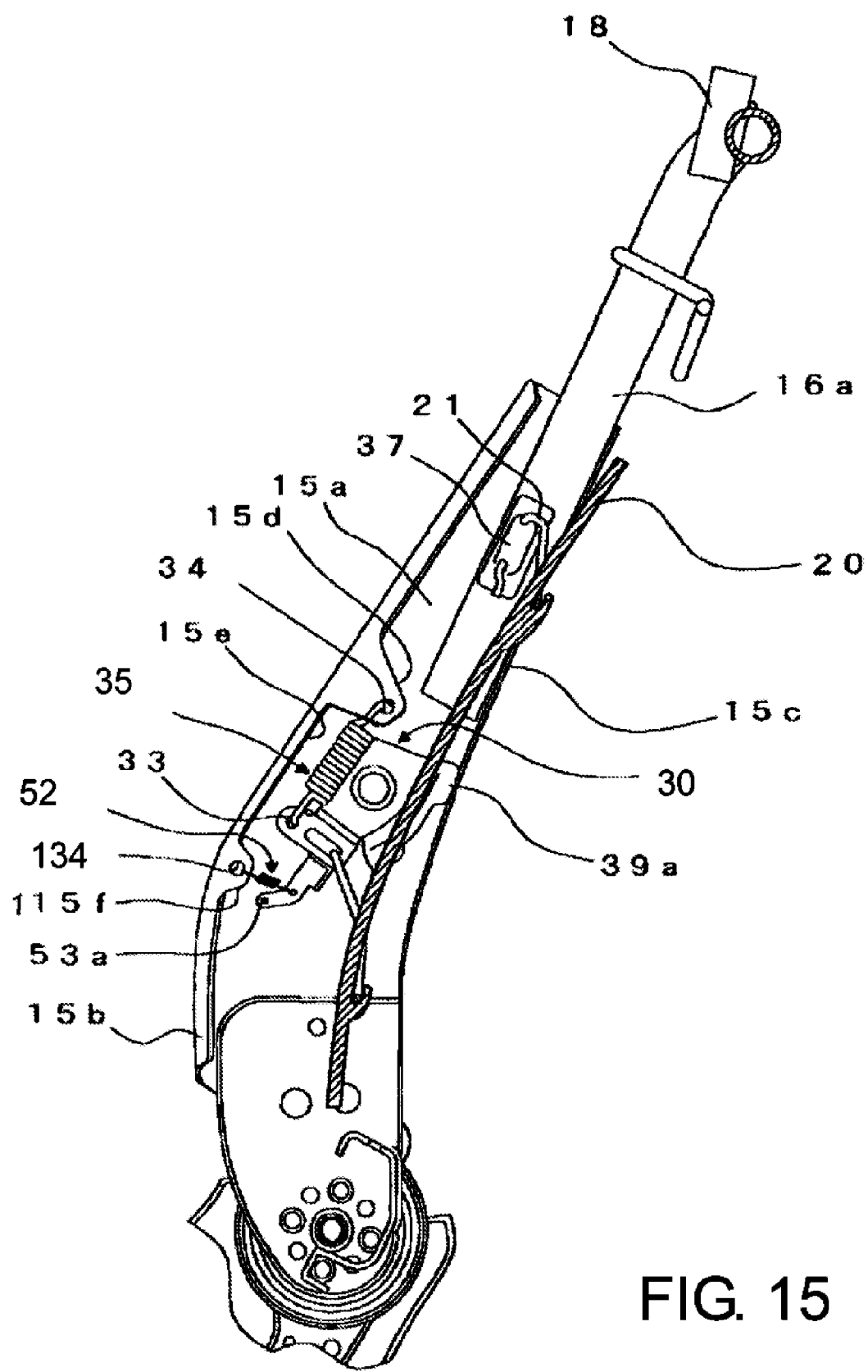
FIG. 15 is a schematic cross-sectional explanatory view of a seat back frame before the movement of a shock reducing member.
Figure 16:
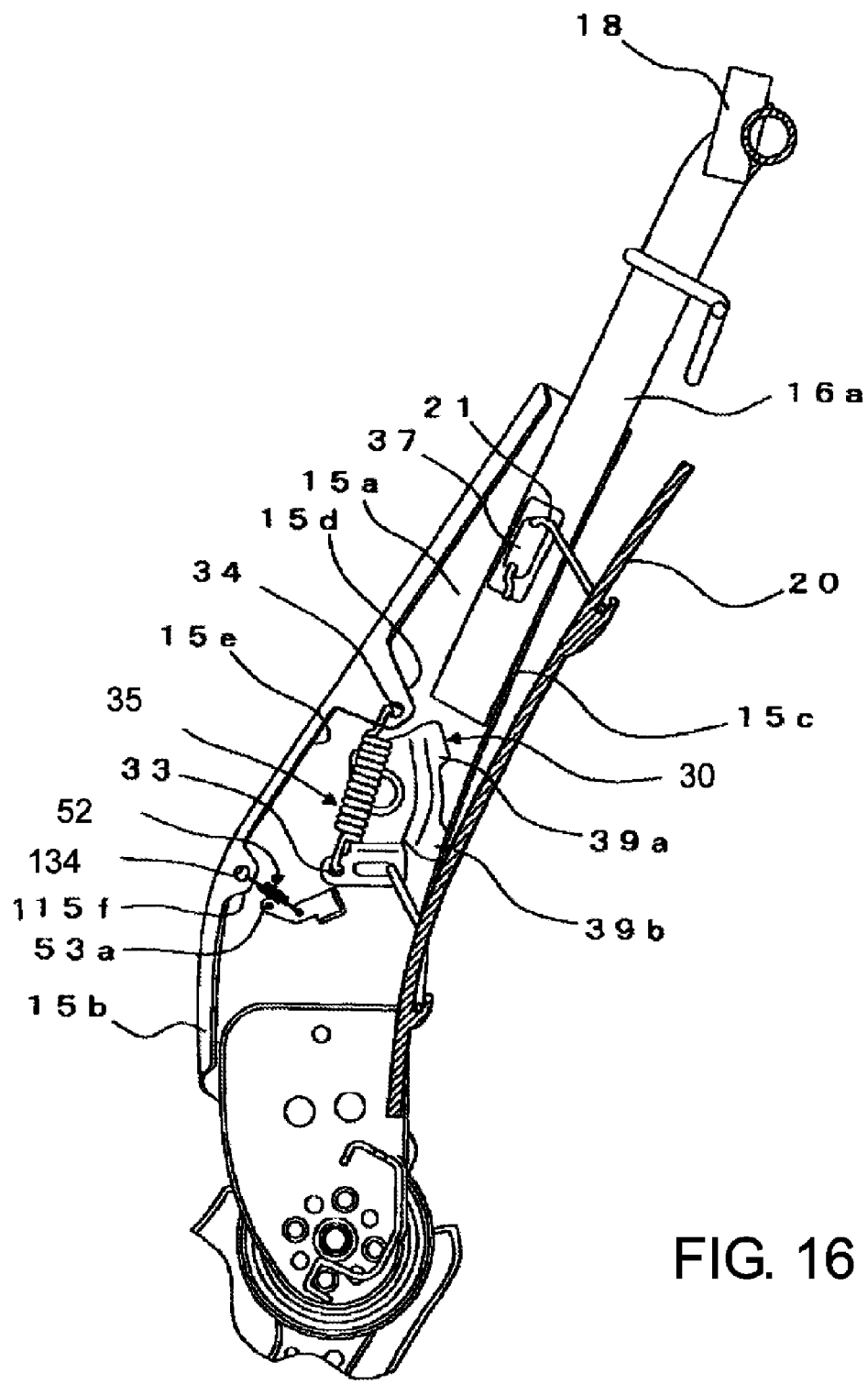
FIG. 16 is a schematic cross-sectional explanatory view of a seat back frame after the movement of a shock reducing member.
Figure 17A:
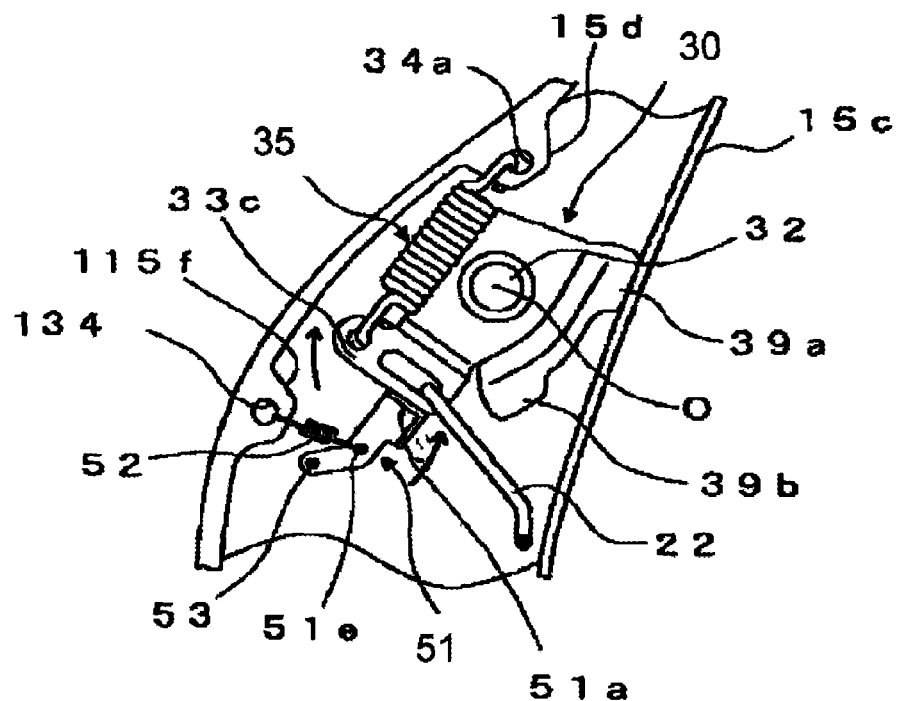
FIGS. 17A, B are side explanatory views showing a state of a shock reducing member, an urging element, and a lock mechanism before and during rear-end collision.
Figure 17B:
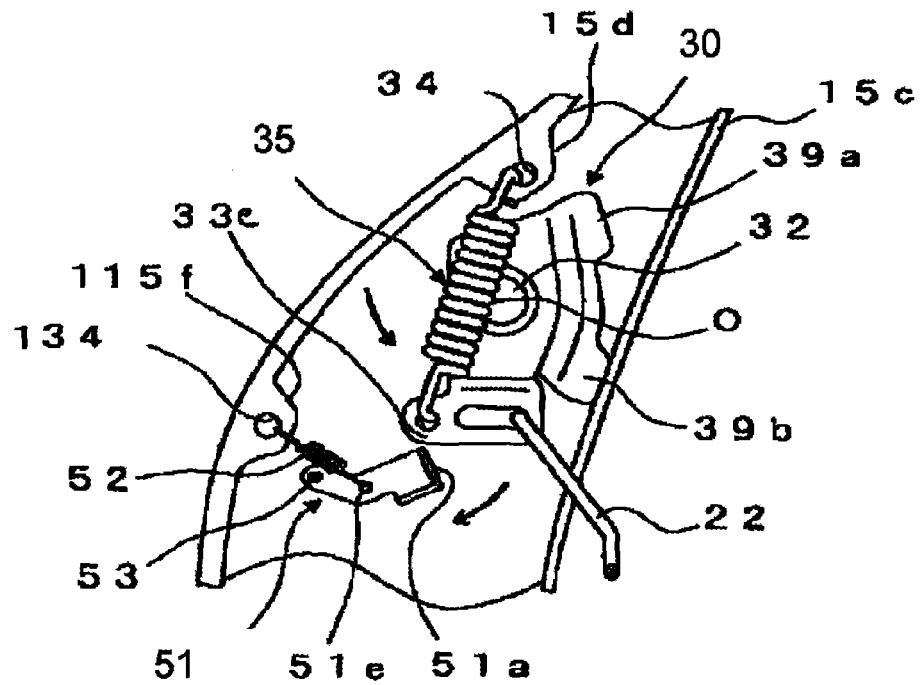

As for the rotating member 30 at the time of rear-end collision, FIG. 15 shows the rotating member 30 before rotating (before rear-end collision), FIG. 16 shows the rotating member 30 after rotating (during rear-end collision), and in FIG. 17, FIG. 17(a) shows the state before rotating (before rear-end collision) and FIG. 17(b) shows the state after rotating (during rear-end collision).

As shown in FIG. 17, at the usual seating time, the lock main body 51 of the lock mechanism 50 comes into contact with the lower side of the rotating member 30 to inhibit the rotating of the rotating member 30. At the time of rear-end collision, when a shock is applied from the rear, the lock mechanism 50 releases the inhibition of rotating of the rotating member 30 on account of the application of the shock having a certain or larger magnitude from the rear, and thereby allows the rotating of the rotating member 30 against the urging force of the tensile coil spring 52 serving as the lock urging element.

That is to say, at the usual seating time, the rotating member 30 is urged clockwise by the tensile coil spring 35, and the lock main body 51 constituting the lock mechanism 50 is urged counterclockwise by the tensile coil spring 52. Therefore, as shown in FIG. 17A, the contact surface of the contact part 51a of the lock main body 51 and the lower end surface of the formation part 30c of the rotating member 30 are in contact with each other, whereby the movement of the rotating member 30 is inhibited. Thus, the rotating member 30 and the lock main body 51 are always biased by the tensile coil spring 52 to prevent a play.

However, in the case where rear-end collision occurs, when a shock having a certain or larger magnitude is applied from the rear, the rotating member 30 sways greatly to the front (clockwise) in a moment. On the other hand, the lock main body 51 of the lock mechanism 50 tends to remain due to its own weight by means of inertial force (that is, rotates to the rear relatively). At this time, since the lock main body 51 is formed so that the weight of a portion including the contact part 51a is larger than the weight of other parts, and the center of gravity is high, the contact part 51a tends to stay, and rotates clockwise around the rotating shaft 53 formed on the vehicle lower side of the contact part 51a, so that the contact of the contact part 51a with the rotating member 30 is broken off. Thereby, the lock main body 51 rotates as shown in FIG. 17(b), the contact part 51a separates from the rotating member 30, and the inhibition of rotating of the rotating member 30 due to the lock mechanism is released, so that the rotating member 30 can rotate against the urging force of the tensile coil spring 35.

When the passenger is going to move to the rear due to inertia, the load from the passenger is applied to the pressure receiving member 20, whereby a tension is applied, via the pressure receiving member 20 and the wire 22 locked to the pressure receiving member 20, in the direction such that the rotating member 30 is rotated to the rear (to the right-hand side in FIG. 17). The tension applied at this time extends the tensile coil spring 35 that allows the rotating member 30 to stay at the initial position, and serves as a load sufficient for the rotating member 30 to rotate to the rear.

In the lock mechanism 50, the position of the rotating shaft 53, the position of the center of gravity of the lock main body 51, and the like are set properly so that the contact of the lock main body 51 with the rotating member 30 is released by the shock applied from the rear as described above.

As described above, in this embodiment, there is provided the lock mechanism 50 to inhibit the rotating of the rotating member 30 serving as the shock reducing member at the usual seating time, and to release the inhibition of rotating of the rotating member 30 when a shock having a certain magnitude is applied from the rear by rear-end collision. Therefore, at the usual seating time, a play of the shock reducing member is prevented, and thereby the seating feeling of the passenger can be kept good, and when rear-end collision occurs, the operation can be performed with certainty without the inhibition of movement of the shock reducing member.

In the above-described embodiments, an example in which the shock reducing member and the lock mechanism are provided on the side frames on both sides has been explained. However, the configuration may be such that the shock reducing member and the lock mechanism are provided on the side frame on one side. In this case, the side frame on the side on which the shock reducing member is not provided can be configured so that the connecting member (the wire) is directly locked.

In the above-described embodiments, as a specific example, the seat back S1 of the automobile front seat has been explained. However, it is a matter of course that the present invention can also be applied to the seat back of a rear seat.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. For example, an urging "element" may comprise a single monolithic element, such as a spring, or an assembly of individual monolithic elements that are interconnected. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A vehicle seat comprising:
    a seat back frame comprising side parts located on both sides and an upper part disposed above the side parts;
    a headrest disposed above the seat back frame;
    a pressure receiving member connected to the seat back frame via a connecting member; and
    a shock reducing member which is disposed at least on one side of the both-side side parts of the seat back frame, is connected to the connecting member, and is rotatable around a rotating shaft by a predetermined impact load applied to the pressure receiving member,
  wherein:
    the side part comprises a side plate and a rear edge part that is bent to the inside from an end part located on a vehicle rear side of the side plate;
    the shock reducing member comprises:
        a rotate inhibiting part extending in a direction parallel with the rear edge part and in a direction of separating from the side plate;
    a rear surface of the rotate inhibiting part comes into contact with the rear edge part of the side part to inhibit a rotating of the shock reducing member; and
    the rotate inhibiting part comprises a first contact part and a second contact part on the rear surface that make contact with the rear edge part before and after the rotating of the shock reducing member, respectively, and a notch part comprising a recess is formed in the rear surface between the first and second contact parts.

2. The vehicle seat according to claim 1, wherein:
    the side plate has a flat plate-shape, and the rear edge part is bent to the inside in an L shape from the end part located on the vehicle rear side of the side plate.

3. The vehicle seat according to claim 1, wherein:
    the rotate inhibiting part comprises:
    a bend part that is bent in the direction parallel with the rear edge part and in the direction of separating from the side plate, and
    the first and the second contact parts which are continuous with the bend part and bent in the direction perpendicular to the rear edge part.

4. The vehicle seat according to claim 1, wherein the rotate inhibiting part is integrally formed with the shock reducing member.

5. The vehicle seat according to claim 1, wherein the rotate inhibiting part is formed on the vehicle rear side of a center of the rotating shaft of the shock reducing member.

6. The vehicle seat according to claim 1, wherein a contact position of the second contact part and the seat back frame after the rotating of the shock reducing member is located between a horizontal line passing through a center of the rotating shaft of the shock reducing member and a horizontal line passing through a connecting part of the connecting member and the shock reducing member, and the connecting member is formed of a wire.

7. The vehicle seat according to claim 1, wherein the shock reducing member is a first shock reducing member, the vehicle seat comprising a second shock reducing member, the first and second shock reducing members are movable independently from the headrest, and are respectively disposed in the side parts on both sides and are movable independently from one another.

8. The vehicle seat according to claim 1, wherein:
    the contact position of the first contact part with the seat back frame is located higher than the contact position of the second contact part with the seat back frame.

9. The vehicle seat according to claim 1, wherein: one of the contact positions of the first and second contact parts with the seat back frame is located above a center of the rotating shaft of the shock reducing member and the other of the contact positions is located below the center of the rotating shaft.

10. The vehicle seat according to claim 1, wherein:
the contact position of the first contact part with the seat back frame is located above a center of the rotating shaft of the shock reducing member and the contact position of the second contact part with the seat back frame is located below the center of the rotating shaft.

11. The vehicle seat according to claim 1, wherein:
the first and second contact parts are disposed at a different position from the rotating shaft of the shock reducing member.

12. The vehicle seat according to claim 1, wherein:
the notch part is formed at a different position from a position where the pressure receiving member is connected to the shock reducing member.

13. A vehicle seat comprising:
a seat back frame comprising side parts located on both sides and an upper part disposed above the side parts;
a headrest disposed above the seat back frame;
a pressure receiving member connected to the seat back frame via a connecting member;
a shock reducing member which is disposed at least on one side of the both-side side parts of the seat back frame, is connected to the connecting member, and is rotatable around a rotating shaft by a predetermined impact load applied to the pressure receiving member; and
an urging element disposed by attaching a first end part thereof to a shock reducing attachment part formed in the shock reducing member and a second end part thereof to a seat back frame attachment part formed in the seat back frame,
wherein:
the shock reducing member is formed with a rotate inhibiting part which comes into contact with the seat back frame to inhibit a rotating of the shock reducing member;
a line segment connecting the first end part and the second end part of the urging element is entirely located on a vehicle front side of a center of the rotating shaft of the shock reducing member from a time before the operation of the shock reducing member to a time after the operation thereof.

14. The vehicle seat according to claim 13, wherein the rotate inhibiting part is located on a side opposite to the urging element with respect to the center of the rotating shaft of the shock reducing member.

15. The vehicle seat according to claim 13, wherein the shock reducing member is movable independently from the headrest, and is disposed in the side parts on both sides and is movable independently from an other shock reducing member disposed on an other side of the both-side side parts of the seat back frame.

16. The vehicle seat according to claim 13, wherein an upper end of the urging element is disposed above a center of the rotating shaft of the shock reducing member and a lower end of the urging element is disposed below the center of the rotating shaft.

17. The vehicle seat according to claim 13, wherein the urging element and the rotating shaft of the shock reducing member are disposed so as to overlap with each other in a right-to-left direction.

18. A vehicle seat comprising:
a seat back frame comprising side parts located on both sides and an upper part disposed above the side parts;
a headrest disposed above the seat back frame;
a pressure receiving member connected to the seat back frame via a connecting member;
a shock reducing member which is disposed at least on one side of the both-side side parts of the seat back frame, is connected to the connecting member, and is rotatable around a rotating shaft by a predetermined impact load applied to the pressure receiving member; and
a spring member disposed by attaching a first end part thereof to a shock reducing member attachment part formed in the shock reducing member and a second end part thereof to a seat back frame attachment part formed in the seat back frame,
wherein:
the shock reducing member is formed with a rotate inhibiting part which comes into contact with the seat back frame to inhibit a rotating of the shock reducing member, and
a line segment connecting a first engagement point of the first end part of the spring member engaged with the shock reducing attachment part and a second engagement point of the second end part of the spring member engaged with the seat back frame attachment part is entirely located on a vehicle front side of the rotating shaft of the shock reducing member from a time before the operation of the shock reducing member to a time after the operation thereof.

19. The vehicle seat according to claim 18, wherein:
the spring member is a coil spring; and
the line segment connecting the first engagement point and the second engagement point is a center line of the coil spring.

20. The vehicle seat according to claim 18, wherein an upper end of the spring member is disposed above a center of the rotating shaft of the shock reducing member and a lower end of the spring member is disposed below the center of the rotating shaft.

21. The vehicle seat according to claim 18, wherein the spring member the rotating shaft of the shock reducing member are disposed so as to overlap with each other in a right-to-left direction.

* * * * *